US012772092B2

(12) United States Patent
Liu et al.

(10) Patent No.: US 12,772,092 B2
(45) Date of Patent: Oct. 20, 2026

(54) BEAM MEASUREMENT REPORTING FOR AERIAL USER EQUIPMENT

(71) Applicant: QUALCOMM Incorporated, San Diego, CA (US)

(72) Inventors: Le Liu, San Jose, CA (US); Alberto Rico Alvarino, San Diego, CA (US); Peter Gaal, San Diego, CA (US); Chiranjib Saha, Lakeside, CA (US); Umesh Phuyal, San Diego, CA (US); Alexandros Manolakos, Escondido, CA (US); Kazuki Takeda, Minato-ku (JP); Xiao Feng Wang, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 346 days.

(21) Appl. No.: 18/556,262

(22) PCT Filed: May 23, 2022

(86) PCT No.: PCT/US2022/072502
§ 371 (c)(1),
(2) Date: Oct. 19, 2023

(87) PCT Pub. No.: WO2023/278913
PCT Pub. Date: Jan. 5, 2023

(65) Prior Publication Data

US 2024/0187911 A1 Jun. 6, 2024

(30) Foreign Application Priority Data

Jun. 28, 2021 (GR) .............................. 20210100430

(51) Int. Cl.
*H04W 24/10* (2009.01)
*H04B 17/318* (2015.01)
*H04W 36/00* (2009.01)

(52) U.S. Cl.
CPC .......... *H04W 24/10* (2013.01); *H04B 17/328* (2023.05); *H04W 36/00837* (2018.08)

(58) Field of Classification Search
CPC ........... H04W 24/10; H04W 36/00837; H04W 36/0094; H04W 36/0058; H04B 17/328; H04B 7/0626; H04B 17/327
See application file for complete search history.

(56) References Cited

U.S. PATENT DOCUMENTS

2018/0241453 A1* 8/2018 Lee ....................... H04L 1/0028
2019/0173567 A1 6/2019 Jalali
(Continued)

FOREIGN PATENT DOCUMENTS

CN 111869118 A 10/2020
WO WO-2020157670 A1 * 8/2020 ......... H04B 7/06952
WO 2021080720 A1 4/2021

OTHER PUBLICATIONS

Huawei., et al., "Potential Enhancements for Drones", 3GPP TSG RAN WG1 Meeting #89, R1-1707016, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, May 14, 2017, XP051272246, 3 Pages, the whole document.
(Continued)

*Primary Examiner* — Afshawn M Towfighi
(74) *Attorney, Agent, or Firm* — Harrity & Harrity, LLP

(57) ABSTRACT

Various aspects of the present disclosure generally relate to wireless communication. In some aspects, a user equipment (UE) may receive, from a serving cell, an event-based measurement report configuration that indicates a measure-
(Continued)

ment threshold and a beam quantity threshold that is two or more. The UE may determine that a first set of measurements of a first plurality of reference signals satisfy the measurement threshold. Each of the first plurality of reference signals may be associated with a corresponding one of a first plurality of beams. Accordingly, the UE may transmit, to the serving cell, a report based at least in part on the first set of measurements when the first plurality of beams includes a quantity of beams that satisfies the beam quantity threshold. Numerous other aspects are described.

20 Claims, 12 Drawing Sheets

(56) References Cited

U.S. PATENT DOCUMENTS

| | | | | |
|---|---|---|---|---|
| 2019/0394666 | A1* | 12/2019 | Li | H04B 7/0417 |
| 2020/0052803 | A1* | 2/2020 | Deenoo | H04B 17/327 |
| 2020/0145863 | A1 | 5/2020 | Yang | |
| 2021/0160721 | A1* | 5/2021 | Panchal | G06N 20/00 |
| 2022/0330075 | A1* | 10/2022 | Yan | H04W 24/10 |
| 2023/0007521 | A1* | 1/2023 | Takahashi | H04W 16/28 |
| 2023/0337032 | A1* | 10/2023 | Han | H04W 24/10 |
| 2023/0345281 | A1* | 10/2023 | Xu | H04W 36/0088 |

OTHER PUBLICATIONS

International Search Report and Written Opinion—PCT/US2022/072502—ISA/EPO—Sep. 9, 2022.

* cited by examiner

300

BEAM MEASUREMENT REPORTING FOR AERIAL USER EQUIPMENT

CROSS-REFERENCE TO RELATED APPLICATION

This patent application is a 35 U.S.C. 371 national stage application of PCT Application No. PCT/US2022/072502, filed on May 23, 2022, entitled "MEASUREMENT AND REPORTING FOR AERIAL USER EQUIPMENT," which claims priority to Greek Patent Application No. 20210100430, filed on Jun. 28, 2021, entitled "MEASUREMENT AND REPORTING FOR AERIAL USER EQUIPMENT," both of which are hereby expressly incorporated by reference herein.

FIELD OF THE DISCLOSURE

Aspects of the present disclosure generally relate to wireless communication and to techniques and apparatuses for measurement and reporting procedures for aerial user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a user equipment (UE). The apparatus may include a memory. The apparatus may include one or more processors, coupled to the memory, configured, receive, from a serving cell, an event-based measurement report configuration that indicates a measurement threshold and a beam quantity threshold that is two or more determine that a first set of measurements of a first plurality of reference signals satisfy the measurement threshold, where each of the first plurality of reference signals is associated with a corresponding one of a first plurality of beams transmit, to the serving cell, a report based at least in part on the first set of measurements when the first plurality of beams includes a quantity of beams that satisfies the beam quantity threshold.

Some aspects described herein relate to an apparatus for wireless communication at a base station. The apparatus may include a memory. The apparatus may include one or more processors, coupled to the memory, configured, transmit, to a UE, an event-based measurement report configuration that indicates a measurement threshold and a beam quantity threshold that is two or more receive, from the UE, a report based at least in part on a first set of measurements of a first plurality of reference signals satisfying the measurement threshold, and a first plurality of beams including a quantity of beams satisfying the beam quantity threshold, where each of the first plurality of reference signals is associated with a corresponding one of the first plurality of beams.

Some aspects described herein relate to an apparatus for wireless communication at a UE. The apparatus may include a memory. The apparatus may include one or more processors, coupled to the memory, configured, receive, from a base station, an indication of a first set of reference signals and an indication of a first subset, of the first set of reference signals, that is associated with one or more uptilt antennas of the base station transmit, to the base station, a report based at least in part on the indications.

Some aspects described herein relate to an apparatus for wireless communication at a base station. The apparatus may include a memory. The apparatus may include one or more processors, coupled to the memory, configured, transmit, to a UE, an indication of a first set of reference signals and an indication of a first subset, of the first set of reference signals, that is associated with one or more uptilt antennas of the base station receive, from the UE, a report based at least in part on the indications.

Some aspects described herein relate to a method of wireless communication performed by a UE. The method may include receiving, from a serving cell, an event-based measurement report configuration that indicates a measurement threshold and a beam quantity threshold that is two or more. The method may include determining that a first set of measurements of a first plurality of reference signals satisfy the measurement threshold, wherein each of the first plurality of reference signals is associated with a corresponding one of a first plurality of beams. The method may include transmitting, to the serving cell, a report based at least in part on the first set of measurements when the first plurality of beams includes a quantity of beams that satisfies the beam quantity threshold.

Some aspects described herein relate to a method of wireless communication performed by a base station. The method may include transmitting, to a UE, an event-based measurement report configuration that indicates a measurement threshold and a beam quantity threshold that is two or more. The method may include receiving, from the UE, a report based at least in part on a first set of measurements of a first plurality of reference signals satisfying the measurement threshold, and a first plurality of beams including a quantity of beams satisfying the beam quantity threshold, wherein each of the first plurality of reference signals is associated with a corresponding one of the first plurality of beams.

Some aspects described herein relate to a method of wireless communication performed by a UE. The method may include receiving, from a base station, an indication of a first set of reference signals and an indication of a first subset, of the first set of reference signals, that is associated with one or more uptilt antennas of the base station. The method may include transmitting, to the base station, a report based at least in part on the indications.

Some aspects described herein relate to a method of wireless communication performed by a base station. The method may include transmitting, to a UE, an indication of a first set of reference signals and an indication of a first subset, of the first set of reference signals, that is associated with one or more uptilt antennas of the base station. The method may include receiving, from the UE, a report based at least in part on the indications.

Some aspects described herein relate to a non-transitory computer-readable medium that stores a set of instructions for wireless communication by a UE. The set of instructions, when executed by one or more processors of the UE, may cause the UE to receive, from a serving cell, an event-based measurement report configuration that indicates a measurement threshold and a beam quantity threshold that is two or more. The set of instructions, when executed by one or more processors of the UE, may cause the UE to determine that a first set of measurements of a first plurality of reference signals satisfy the measurement threshold, wherein each of the first plurality of reference signals is associated with a corresponding one of a first plurality of beams. The set of instructions, when executed by one or more processors of the UE, may cause the UE to transmit, to the serving cell, a report based at least in part on the first set of measurements when the first plurality of beams includes a quantity of beams that satisfies the beam quantity threshold.

Some aspects described herein relate to a non-transitory computer-readable medium that stores a set of instructions for wireless communication by a base station. The set of instructions, when executed by one or more processors of the base station, may cause the base station to transmit, to a UE, an event-based measurement report configuration that indicates a measurement threshold and a beam quantity threshold that is two or more. The set of instructions, when executed by one or more processors of the base station, may cause the base station to receive, from the UE, a report based at least in part on a first set of measurements of a first plurality of reference signals satisfying the measurement threshold, and a first plurality of beams including a quantity of beams satisfying the beam quantity threshold, wherein each of the first plurality of reference signals is associated with a corresponding one of the first plurality of beams.

Some aspects described herein relate to a non-transitory computer-readable medium that stores a set of instructions for wireless communication by a UE. The set of instructions, when executed by one or more processors of the UE, may cause the UE to receive, from a base station, an indication of a first set of reference signals and an indication of a first subset, of the first set of reference signals, that is associated with one or more uptilt antennas of the base station. The set of instructions, when executed by one or more processors of the UE, may cause the UE to transmit, to the base station, a report based at least in part on the indications.

Some aspects described herein relate to a non-transitory computer-readable medium that stores a set of instructions for wireless communication by a base station. The set of instructions, when executed by one or more processors of the base station, may cause the base station to transmit, to a UE, an indication of a first set of reference signals and an indication of a first subset, of the first set of reference signals, that is associated with one or more uptilt antennas of the base station. The set of instructions, when executed by one or more processors of the base station, may cause the base station to receive, from the UE, a report based at least in part on the indications.

Some aspects described herein relate to an apparatus for wireless communication. The apparatus may include means for receiving, from a serving cell, an event-based measurement report configuration that indicates a measurement threshold and a beam quantity threshold that is two or more. The apparatus may include means for determining that a first set of measurements of a first plurality of reference signals satisfy the measurement threshold, wherein each of the first plurality of reference signals is associated with a corresponding one of a first plurality of beams. The apparatus may include means for transmitting, to the serving cell, a report based at least in part on the first set of measurements when the first plurality of beams includes a quantity of beams that satisfies the beam quantity threshold.

Some aspects described herein relate to an apparatus for wireless communication. The apparatus may include means for transmitting, to a UE, an event-based measurement report configuration that indicates a measurement threshold and a beam quantity threshold that is two or more. The apparatus may include means for receiving, from the UE, a report based at least in part on a first set of measurements of a first plurality of reference signals satisfying the measurement threshold, and a first plurality of beams including a quantity of beams satisfying the beam quantity threshold, wherein each of the first plurality of reference signals is associated with a corresponding one of the first plurality of beams.

Some aspects described herein relate to an apparatus for wireless communication. The apparatus may include means for receiving, from a base station, an indication of a first set of reference signals and an indication of a first subset, of the first set of reference signals, that is associated with one or more uptilt antennas of the base station. The apparatus may include means for transmitting, to the base station, a report based at least in part on the indications.

Some aspects described herein relate to an apparatus for wireless communication. The apparatus may include means for transmitting, to a UE, an indication of a first set of reference signals and an indication of a first subset, of the first set of reference signals, that is associated with one or more uptilt antennas of the apparatus. The apparatus may include means for receiving, from the UE, a report based at least in part on the indications.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
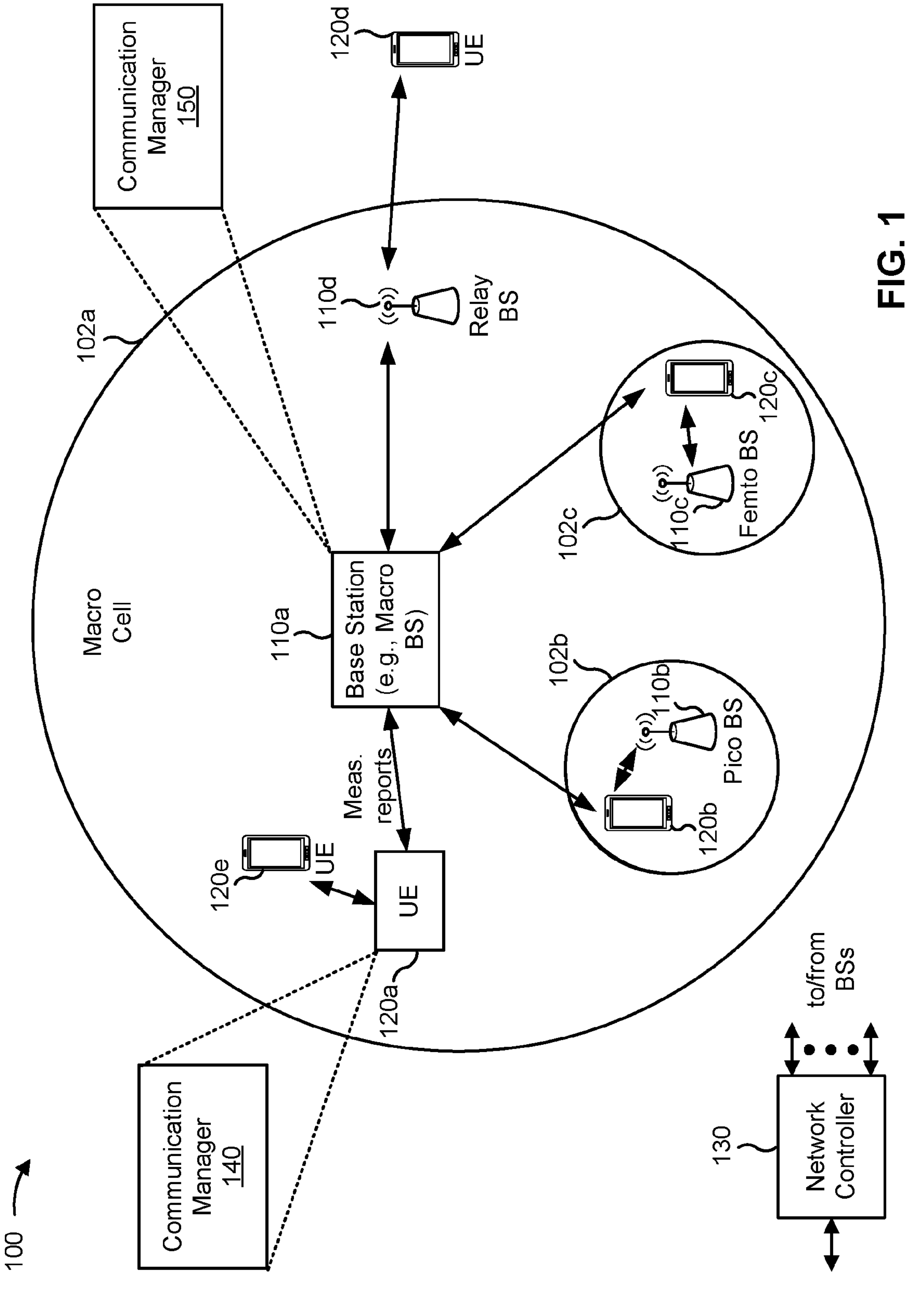
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smartjewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a serving cell (e.g., from the base station 110), an event-based measurement report configuration that indicates a measurement threshold and a beam quantity threshold that is two or more; determine that a first set of measurements of a first plurality of reference signals satisfy the measurement threshold, where each of the first plurality of reference signals is associated with a corresponding one of a first plurality of beams; and transmit, to the serving cell, a report based at least in part on the first set of measurements when the first plurality of beams includes a quantity of beams that satisfies the beam quantity threshold. Additionally, or alternatively, the communication manager 140 may receive, from a base station (e.g., the base station 110), an indication of a first set of reference signals and an indication of a first subset, of the first set of reference signals, that is associated with one or more uptilt antennas of the base station; and transmit, to the base station, a report based at least in part on the indications. Additionally, or alternatively, the communication manager 140 may perform one or more other operations described herein.

In some aspects, the base station 110 may include a communication manager 150. As described in more detail elsewhere herein, the communication manager 150 may transmit, to a UE (e.g., the UE 120), an event-based measurement report configuration that indicates a measurement threshold and a beam quantity threshold that is two or more; and receive, from the UE, a report based at least in part on a first set of measurements of a first plurality of reference signals satisfying the measurement threshold, and a first plurality of beams including a quantity of beams satisfying the beam quantity threshold, where each of the first plurality of reference signals is associated with a corresponding one of the first plurality of beams. Additionally, or alternatively, the communication manager 150 may transmit, to a UE (e.g., the UE 120), an indication of a first set of reference signals and an indication of a first subset, of the first set of reference signals, that is associated with one or more uptilt antennas of the base station; and receive, from the UE, a report based at least in part on the indications. Additionally, or alternatively, the communication manager 150 may perform one or more other operations described herein.

As indicated above, FIG. 1 is provided as an example. Other examples may differ from what is described with regard to FIG. 1.

Figure 2:
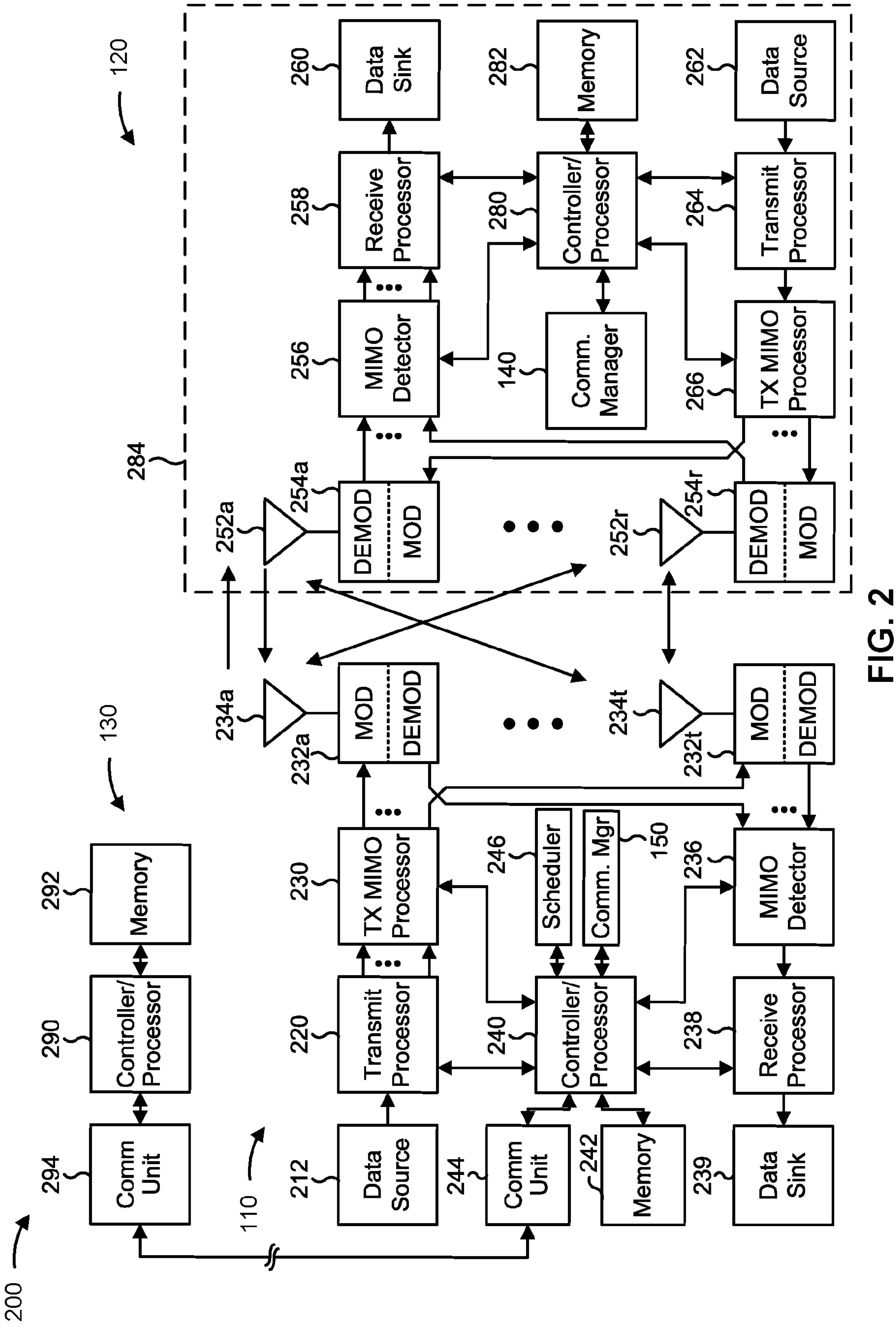
FIG. 2 is a diagram illustrating an example of a base station in communication with a user equipment (UE) in a wireless network, in accordance with the present disclosure.

FIG. 2 is a diagram illustrating an example 200 of abase station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-12).

The controller/processor 240 of the base station 110, the controller/processor 280 of the UE 120, and/or any other component(s) of FIG. 2 may perform one or more techniques associated with measurement and reporting procedures for aerial UEs, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

Figure 11:
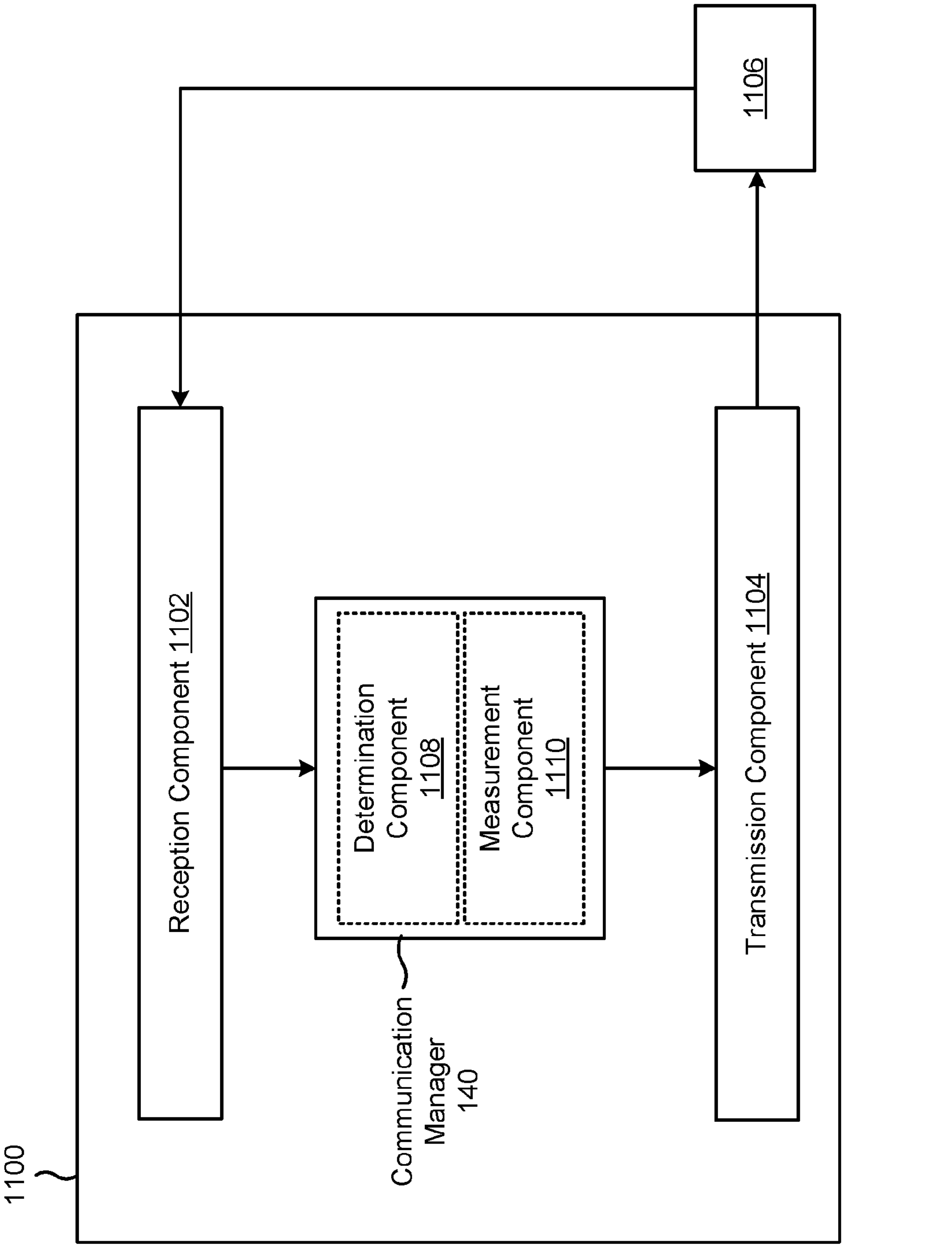
FIGS. 11 and 12 are diagrams of example apparatuses for wireless communication, in accordance with the present disclosure.
Figure 12:
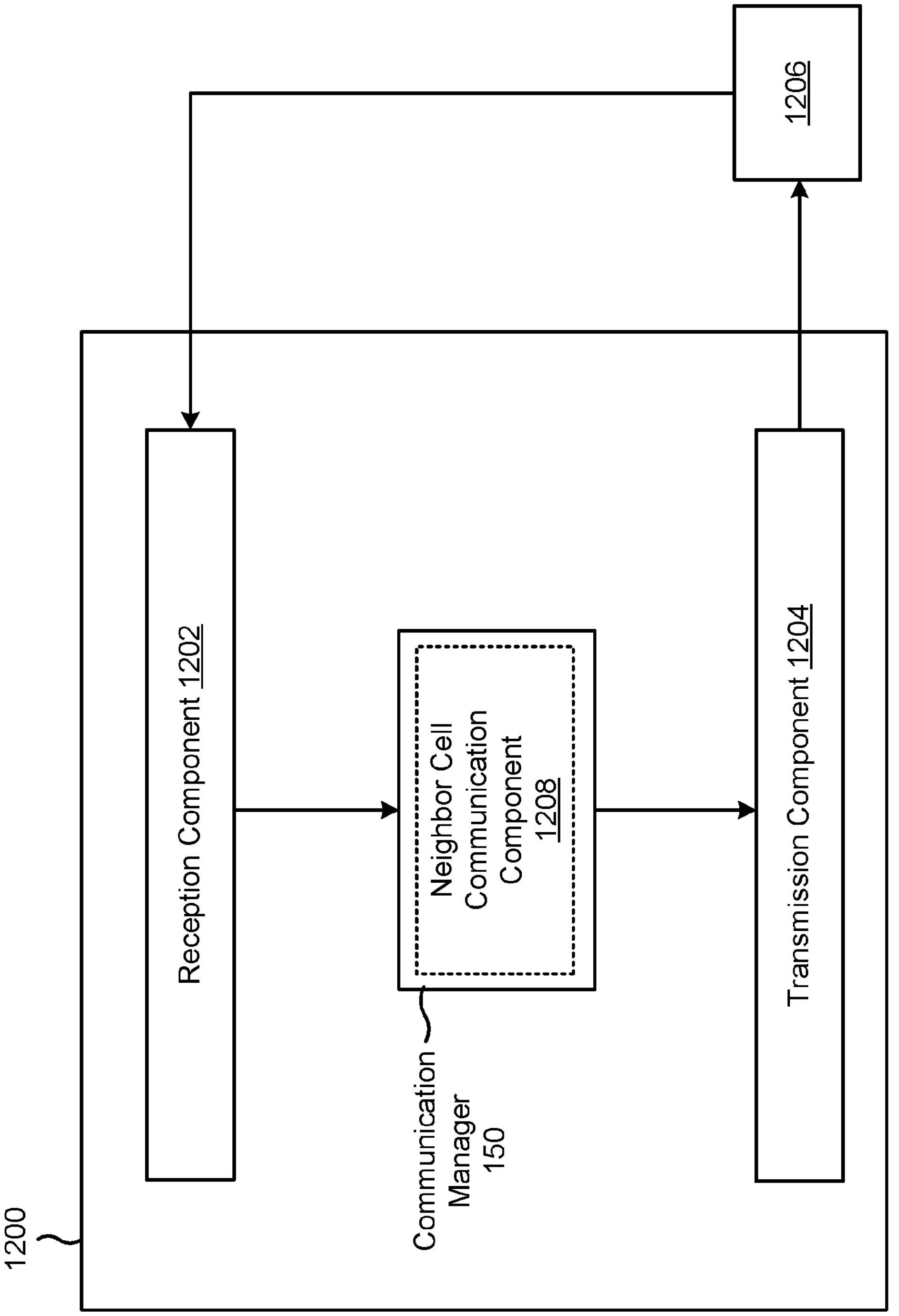

In some aspects, a UE (e.g., the UE 120 and/or apparatus 1100 of FIG. 11) may include means for receiving, from a serving cell (e.g., including the base station 110 and/or apparatus 1200 of FIG. 12), an event-based measurement report configuration that indicates a measurement threshold and a beam quantity threshold that is two or more; means for determining that a first set of measurements of a first plurality of reference signals satisfy the measurement threshold, wherein each of the first plurality of reference signals is associated with a corresponding one of a first plurality of beams; and/or means for transmitting, to the serving cell, a report based at least in part on the first set of measurements when the first plurality of beams includes a quantity of beams that satisfies the beam quantity threshold. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Additionally, or alternatively, the UE may include means for receiving, from a base station (e.g., the base station 110 and/or apparatus 1200 of FIG. 12), an indication of a first set of reference signals and an indication of a first subset, of the first set of reference signals, that is associated with one or more uptilt antennas of the base station; and/or means for transmitting, to the base station, a report based at least in part on the indications. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., the base station 110 and/or apparatus 1200 of FIG. 12) may include means for transmitting, to a UE (e.g., the UE 120 and/or apparatus 1100 of FIG. 11), an event-based measurement report configuration that indicates a measurement threshold and a beam quantity threshold that is two or more; and/or means for receiving, from the UE, a report based at least in part on a first set of measurements of a first plurality of reference signals satisfying the measurement threshold, and a first plurality of beams including a quantity of beams satisfying the beam quantity threshold, wherein each of the first plurality of reference signals is associated with a corresponding one of the first plurality of beams. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Additionally, or alternatively, the base station may include means for transmitting, to a UE (e.g., the UE 120 and/or apparatus 1100 of FIG. 11), an indication of a first set of reference signals and an indication of a first subset, of the first set of reference signals, that is associated with one or more uptilt antennas of the base station; and/or means for receiving, from the UE, a report based at least in part on the indications. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
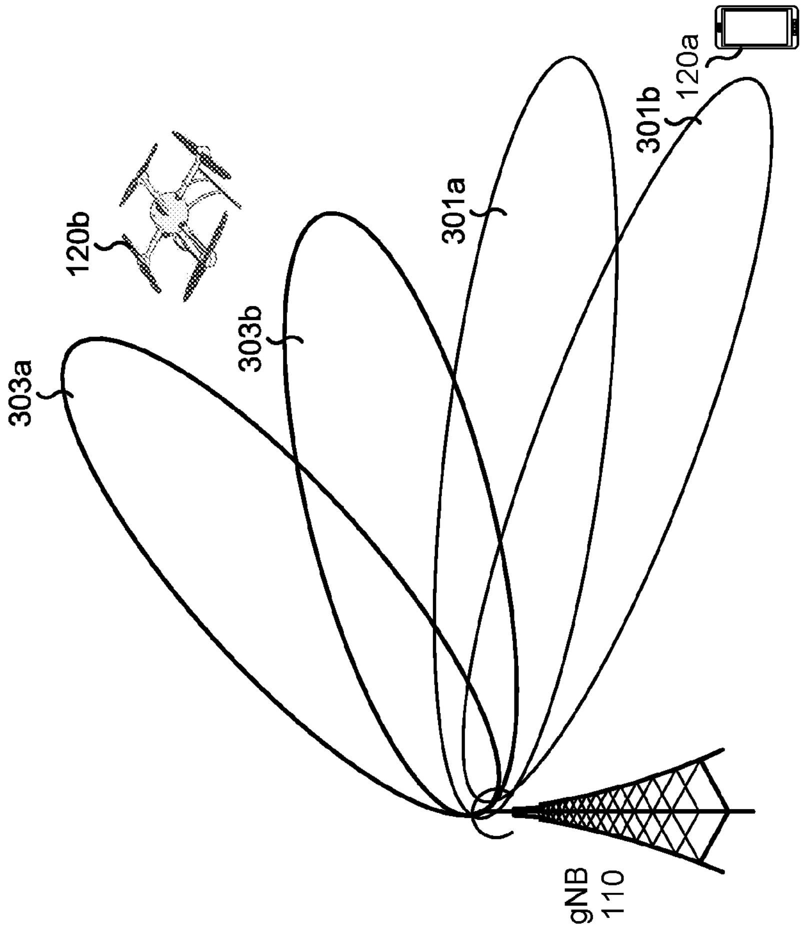
FIG. 3 is a diagram illustrating an example of a base station (gNB) with uptilt and downtilt antennas, in accordance with the present disclosure.

FIG. 3 is a diagram illustrating an example 300 of a base station with uptilt and downtilt antennas, in accordance with the present disclosure. In example 300, gNB 110 may include one or more antennas that are configured to generate beams directed downward (e.g., beam 301*a* and beam 301*b*). Accordingly, a terrestrial UE 120*a* may measure reference signals and/or receive data signals from the gNB 110 transmitted using beam 301*a* and/or beam 301*b*. Accordingly, beams 301*a* and 301*b* may be associated with the downtilt antenna(s) and may be referred to as "terrestrial beams." Additionally, or alternatively, a "terrestrial beam" may refer to a beam from the gNB 110 that is associated with a negative angle with respect to an axis parallel to the ground and/or that satisfies a threshold with respect to a range associated with the beam (e.g., by having a smaller range than aerial beams, as described below). Although described using two terrestrial beams, the description similarly applies to additional terrestrial beams (e.g., three terrestrial beams, four terrestrial beams, and so on).

Additionally in example 300, the gNB 110 may further include one or more antennas that are configured to generate beams directed upward (e.g., beam 303*a* and beam 303*b*). Accordingly, an aerial UE 120*b* may measure reference signals and/or receive data signals from the gNB 110 transmitted using beam 303*a* and/or beam 303*b*. Accordingly, beams 303*a* and 303*b* may be associated with the uptilt antenna(s) and may be referred to as "aerial beams." Additionally, or alternatively, an "aerial beam" may refer to a beam from the gNB 110 that is associated with a positive angle with respect to an axis parallel to the ground and/or that does not satisfy a threshold with respect to a range associated with the beam (e.g., by having a larger range than terrestrial beams, as described above). Although described using two aerial beams, the description similarly applies to additional aerial beams (e.g., three aerial beams, four aerial beams, and so on).

Therefore, an "aerial UE" may refer to a UE that is capable of sustaining an altitude for at least a few seconds using hardware associated with the UE and/or to a UE that is capable of satisfying an altitude threshold for at least a few seconds. Similarly, a "terrestrial UE" may refer to a UE that cannot sustain an altitude using hardware associated with the UE and/or to a UE that cannot satisfy the altitude threshold for at least a few seconds.

Each beam may be associated with a transmission configuration, such as a transmission configuration indicator (TCI) state (e.g., represented by a TCI-State data structure, as defined in 3GPP specifications and/or another standard). For example, the gNB 110 and the UE 120*b* (and/or the UE 120*a*) may be configured for beamformed communications, where the base station may transmit in the direction of the UE 120*b* using a directional BS transmit beam, and the UE 120*b* may receive the transmission using a directional UE receive beam. Each BS transmit beam may have an associated beam ID, beam direction, or beam symbols, among other examples. Accordingly, a downlink beam, such as a BS transmit beam or a UE receive beam, may be associated with a TCI state. A TCI state may indicate a directionality or a characteristic of the downlink beam, such as one or more quasi-co-location (QCL) properties of the downlink beam. For example, a QCL property may be indicated using a qcl-Type indicator within a QCL-Info data structure, as defined in 3GPP specifications and/or another standard. A QCL property may include, for example, a Doppler shift, a Doppler spread, an average delay, a delay spread, or spatial receive parameters, among other examples. In some aspects, a TCI state may be further associated with an antenna port, an antenna panel, and/or a TRP. A TCI state may be associated with one downlink reference signal set (for example, a synchronization signal block (SSB) and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). For example, the downlink reference signal may be indicated using a referenceSignal indicator, within a QCL-Info data structure, as defined in 3GPP specifications and/or another standard. In cases where the QCL type indicates spatial receive parameters, the QCL type may correspond to analog receive beamforming parameters of a UE receive beam at the UE 120*b*.

As indicated above, FIG. 3 is provided as an example. Other examples may differ from what is described with respect to FIG. 3.

Figure 4:
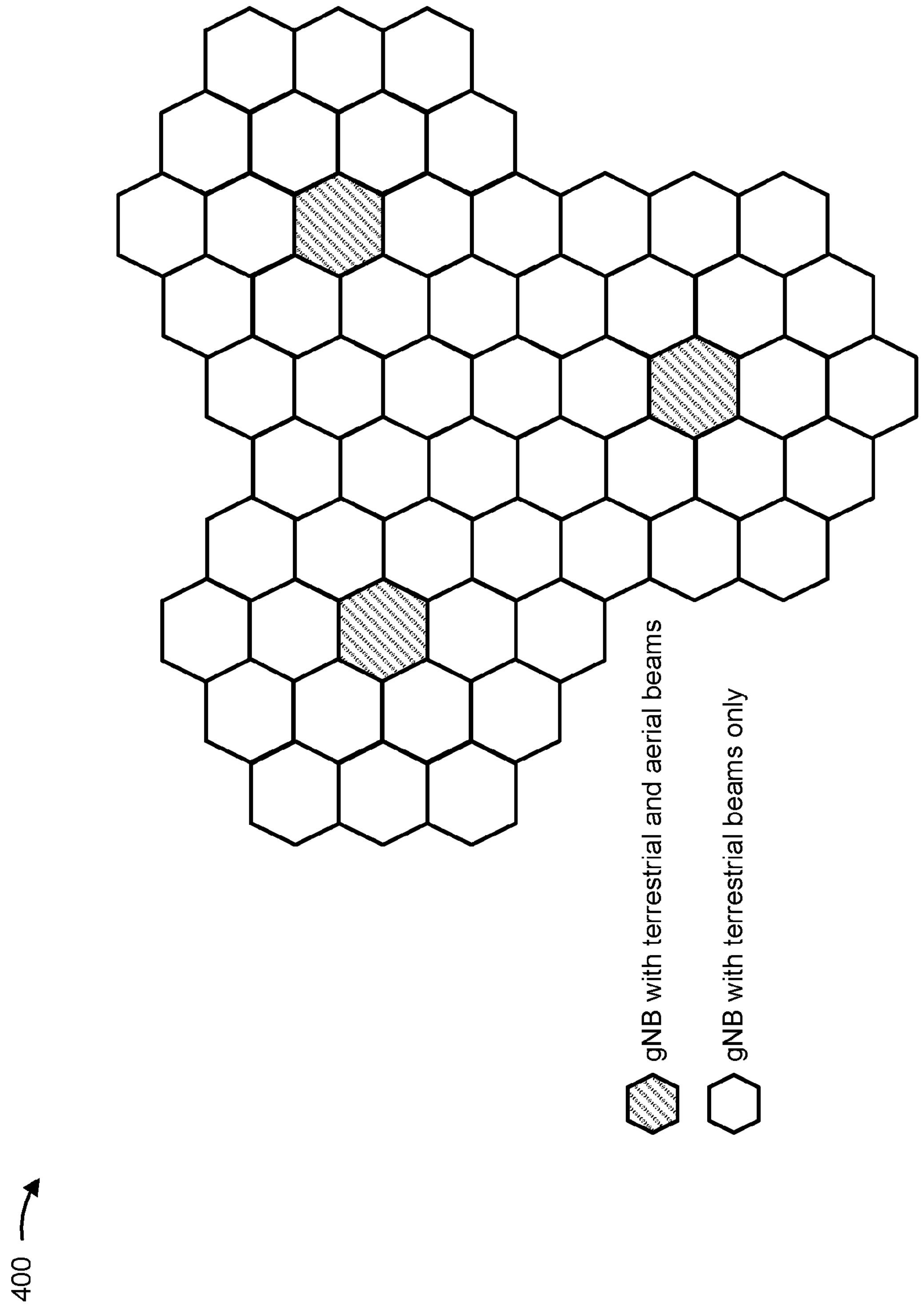
FIG. 4 is a diagram illustrating an example of a cell including multiple gNBs with uptilt and downtilt antennas, in accordance with the present disclosure.

FIG. 4 is a diagram illustrating an example 400 of a cell including multiple gNBs with uptilt and downtilt antennas, in accordance with the present disclosure. As shown in FIG. 4, the cell includes a plurality of gNB, each with an associated geographic zone (e.g., depicted as hexagons in FIG. 4). In example 400, some gNBs within the cell are configured to transmit using both terrestrial and aerial beams. However, other gNBs within the cell are configured to transmit only using terrestrial beams. Because aerial beams are generally associated with larger ranges than terrestrial beams, fewer gNBs can be used while still provisioning coverage for aerial UEs throughout the cell. As a result, power and processing resources are conserved within the cell and across the gNBs.

A UE may report (e.g., in channel state information (CSI) reports) measurements of reference signals (e.g., SSBs, CSI-RSs, and/or other reference signals) based at least in part on events. For example, a base station may instruct the UE to report according event A1 (e.g., where a measurement of a reference signal in the serving cell including the base station satisfies a measurement threshold), event A2 (e.g., where a measurement of a reference signal in the serving cell fails to satisfy a measurement threshold), event A3 (e.g., where a measurement of a reference signal in a neighbor cell exceeds a measurement of a reference signal in the serving cell with an offset), event A4 (e.g., where a measurement of a reference signal in a neighbor cell satisfies a measurement threshold), event A5 (e.g., where a measurement of a reference signal in a neighbor cell satisfies a first measurement threshold and a measurement of a reference signal in the serving cell does not satisfy a second measurement threshold), and/or another similar event. However, these events may be triggered very frequently. For example, each cell may transmit using up to 64 beams such that up to 64 different measurements may each trigger transmission of a report to the base station. Accordingly, the UE may expend large amounts of power and consume significant processing resources in order to transmit the reports. Additionally, the UE occupies network resources each time a report is transmitted, which results in network congestion and reduced quality and/or reliability of communications within the serving cell.

The power and processing resource consumption is even larger for an aerial UE because the aerial UE has a larger line-of-sight than a terrestrial UE and therefore can measure reference signals from a larger quantity of neighbor cells than the terrestrial UE can. Accordingly, the aerial UE may incur event more power and processing resource waste than a terrestrial UE when performing event-based reporting of measurements. Additionally, the aerial UE may cause more network congestion than a terrestrial UE when transmitting the event-based reports.

Some techniques and apparatuses described herein enable a base station (e.g., base station 110) to indicate a beam quantity threshold such that a UE (e.g., UE 120) transmits reports when measurements from reference signals satisfy a measurement threshold and are associated with a quantity of beams that satisfies the beam quantity threshold. As described herein, a beam measurement can be layer 1 (L1) level measurement (e.g., without layer 3 (L3) filtering). The event can be triggered only when a quantity of beams, associated with measurements that satisfy the measurement threshold, satisfies the beam quantify threshold. As a result, the UE 120 generates and transmits reports less frequently, which conserves power and processing resources. Additionally, the UE 120 uses fewer network resources overall, which results in less network congestion and thus improved reduced quality and/or reliability of communications within a serving cell that includes the base station 110. In some aspects, the base station 110 may additionally indicate a cell quantity threshold to further reduce a frequency of transmitting reports, which further conserves power and processing resources at the UE 120.

Additionally, or alternatively, some techniques and apparatuses described herein enable a base station (e.g., base station 110) to indicate a subset of reference signals that are associated with aerial beams, as distinguished from reference signals that are associated with terrestrial beams. In some aspects, the measurement configuration for the aerial beams may be different than that of terrestrial beams (e.g., different measurement thresholds and/or different beam quantity thresholds). As a result, an aerial UE (e.g., UE 120) may measure reference signals associated with aerial beams and not reference signals associated with terrestrial beams. As a result, the UE 120 generates and transmits reports less frequently, which conserves power and processing resources. Additionally, the UE 120 uses fewer network resources overall, which results in less network congestion and thus improved reduced quality and/or reliability of communications within a serving cell that includes the base station 110. Similarly, a terrestrial UE may measure reference signals associated with terrestrial beams and not reference signals associated with aerial beams in order to conserve power and processing resources. In some aspects, the base station 110 may additionally indicate a beam quantity threshold and/or a cell quantity threshold to further reduce a frequency of transmitting reports, which further conserves power and processing resources at the UE 120.

As indicated above, FIG. 4 is provided as an example. Other examples may differ from what is described with respect to FIG. 4.

Figure 5:
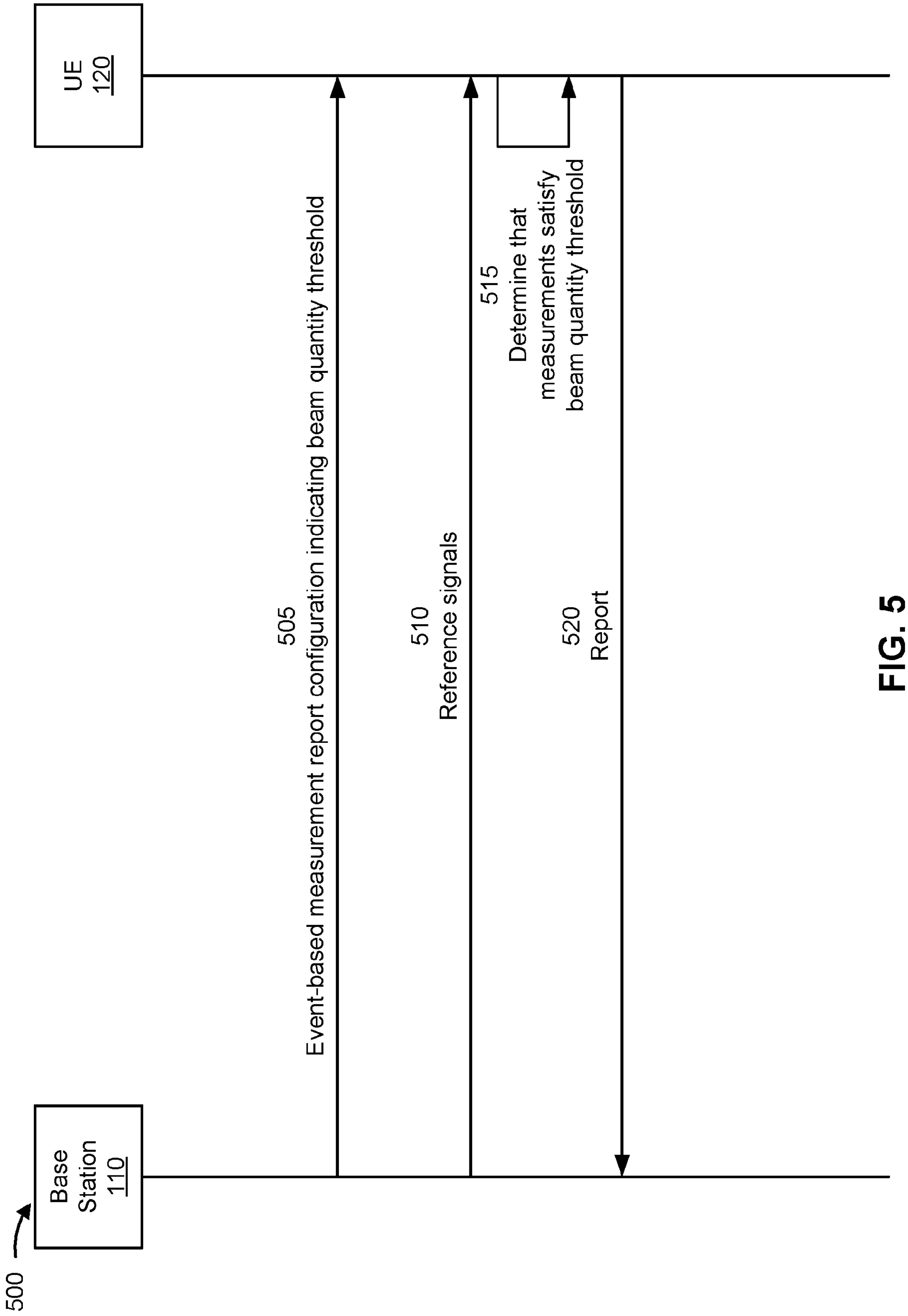
FIG. 5 is a diagram illustrating an example associated with beam-based events for measuring reference signals, in accordance with the present disclosure.

FIG. 5 is a diagram illustrating an example 500 associated with beam-based events for measuring reference signals, in accordance with the present disclosure. As shown in FIG. 5, a base station 110 and a UE 120 may communicate with one another (e.g., on a wireless network, such as wireless network 100 of FIG. 1).

As shown in connection with reference number 505, the base station 110 may transmit, and the UE 120 may receive, an event-based measurement report configuration that indicates a measurement threshold and a beam quantity threshold. For example, the report configuration may include a reportConfig data structure, as defined in 3GPP specifications and/or another standard. Although the description herein focuses on the reportConfig data structure, the description similarly applies to other data structures.

The reportConfig data structure may indicate which type of event triggers the UE 120 to send a report (e.g., a CSI report) to the base station 110. For example, the base station 110 may include an eventdID data structure, as defined in 3GPP specifications and/or another standard. Although the description herein focuses on the eventID data structure, the description similarly applies to other data structures. In some aspects, the base station 110 may indicate an A1 event, an A2 event, an A3 event, an A4 event, an A5 event, and/or another type of event.

The reportConfig data structure may include the measurement threshold as an RSRP value for L1-level beam measurement (e.g., measured by the UE 120 without L3-level filtering). For example, the base station may include a triggerQuantity value, as defined in 3GPP specifications and/or another standard. Although the description herein focuses on the triggerQuantity value, the description similarly applies to other values. In some aspects, other thresholds (e.g., CQIs and/or RSSI values, among other examples) may be used in addition with, or in lieu of, an RSRP value. In some aspects, the measurement threshold may include an absolute value or an offset value (e.g., relative to a measurement associated with a serving cell including the base station 110).

The reportConfig data structure may further include the beam quantity threshold. For example, the base station 110 may indicate that the UE 120 should only send a report (e.g., a CSI report), to the base station 110, when a set of measurements of a set of reference signals satisfy the measurement threshold and when the set of reference signals are associated with a quantity of beams that satisfies the beam quantity threshold (e.g., represented by M). In some aspects, the beam quantity threshold may be at least two (e.g., M≥2).

Additionally, in some aspects, the reportConfig data structure may further include a cell quantity threshold. For example, the base station 110 may indicate that the UE 120 should only send a report (e.g., a CSI report), to the base station 110, when a set of measurements of a set of reference signals satisfy the measurement threshold and when the set of reference signals are associated with a quantity of cells that satisfies the cell quantity threshold (e.g., represented by N). In some aspects, the cell quantity threshold may be at least two (e.g., N≥2).

As shown in connection with reference number 510, the base station 110 may transmit (e.g., broadcast) reference signals. For example, the reference signals may include SSBs, CSI-RSs, and/or other types of reference signals. The UE 120 may measure the reference signals. In some aspects, other base stations associated with the serving cell and/or other base stations associated with other cells may additionally transmit (e.g., broadcast) additional reference signals. Accordingly, the UE 120 may measure the additional reference signals as well.

Each reference signal may be associated with a corresponding beam. For example, the base station 110 (and/or another base station included in the serving cell and/or another base station included in a different cell) may transmit the reference signal using the corresponding beam. Accordingly, the UE 120 may determine that a set of measurements of a plurality of reference signals satisfy the measurement threshold, and each of the reference signals may be associated with a corresponding one of a plurality of beams.

As shown in connection with reference number 515, the UE 120 may additionally determine that the plurality of beams includes a quantity of beams that satisfies the beam quantity threshold. As described above, in some aspects, the base station 110 may additionally indicate a cell quantity threshold. Accordingly, the UE 120 may combine the beam quantity threshold with the cell quantity threshold independently. For example, the plurality of beams may be associated with one or more cells, and the UE 120 may determine that a quantity of the one or more cells satisfies the cell quantity threshold.

As an alternative, the UE 120 may jointly combine the beam quantity threshold with the cell quantity threshold. Accordingly, the beam quantity threshold (e.g., represented by M) may be per cell, such that the UE 120 determines that the beam quantity threshold is satisfied for a quantity of cells that satisfies the cell quantity threshold (e.g., represented by N). For example, the UE 120 may determine that multiple sets of measurements, of multiple pluralities of reference signals, satisfy the measurement threshold. Each of the pluralities of reference signals may be associated with a corresponding plurality of beams, and each of the pluralities of beams may be associated with a corresponding one of one or more cells. Accordingly, the UE 120 may determine that a quantity of the one or more cells, satisfies the cell quantity threshold, and that each plurality of beams includes a quantity of beams that satisfies the beam quantity threshold.

In some aspects, the UE 120 may apply the beam quantity threshold only to aerial beams. For example, as described below in connection with FIG. 6, the base station 110 may indicate a subset, of a set of beams used by the base station 110, associated with uptilt antennas of the base station 110. The set of beams may be associated with a set of reference signals. Accordingly, the UE 120 may determine that a set of measurements, of a subset of the set of reference signals that is associated with the subset of beams, satisfies the measurement threshold. The UE 120 may additionally determine that the subset of beams includes a quantity of beams that satisfies the beam quantity threshold. In some aspects, the measurement threshold may be differently configured for the subset of reference signals associated with uptilt beams and for that associated with downtilt beams. Additionally, or alternatively, the beam quantity threshold may be differently configured for the subset of reference signals associated with uptilt beams and for that associated with downtilt beams.

As described above, in some aspects, the base station 110 may additionally indicate a cell quantity threshold. Accordingly, the UE 120 may combine the beam quantity threshold with the cell quantity threshold independently. For example, the subset of beams may be associated with one or more cells, and the UE 120 may determine that a quantity of the one or more cells satisfies the cell quantity threshold.

As an alternative, the UE 120 may jointly combine the beam quantity threshold with the cell quantity threshold. Accordingly, the beam quantity threshold (e.g., represented by M) may be per cell, such that the UE 120 determines that the beam quantity threshold is satisfied for a quantity of cells that satisfies the cell quantity threshold (e.g., represented by N). For example, the UE 120 may determine that multiple sets of measurements, of multiple subsets of multiple sets of reference signals, satisfy the measurement threshold. Each of the subsets of reference signals may be associated with a corresponding subset of a corresponding set of beams, and each one of the subsets of beams is associated with a corresponding one of one or more cells. The UE 120 may further determine that a quantity of cells, including the one or more cells, satisfies the cell quantity threshold, and that each plurality of beams includes a quantity of beams that satisfies the beam quantity threshold.

As shown in connection with reference number 520, the UE 120 may transmit a report based at least in part on the set of measurements (or the multiple sets of measurements, as described above). The UE 120 may transmit the report based at least in part on the determinations described above. For example, the UE 120 may perform the determinations in order to determine that an event (e.g., indicated by the base station 110 in the event-based measurement report configuration) is triggered and therefore transmit the report based at least in part on triggering of the event.

As described above, example 500 may be combined with example 600. For example, the base station 110 may transmit one or more indications, as described below in connection with FIG. 6, to differentiate aerial beams (e.g., from the base station 110, another base station included in the serving cell, and/or a base station included in another cell) from terrestrial beams. Accordingly, the UE 120 may apply the determinations, as described in connection with FIG. 5, using one or more subsets of the set(s) of reference signals that are associated with beams indicated as aerial (and thus not as terrestrial). Alternatively, the UE 120 may apply the determinations, as described in connection with FIG. 5, using one or more subsets of the set(s) of reference signals that are associated with beams indicated as terrestrial (and thus not as aerial).

By using techniques as described in connection with FIG. 5, the base station 110 may indicate the beam quantity threshold such that the UE 120 transmits a report when the set of measurements (or the multiple sets of measurements, as described above) are associated with a quantity of beams that satisfies the beam quantity threshold. As a result, the UE 120 generates and transmits reports less frequently, which conserves power and processing resources. Additionally, the UE 120 uses fewer network resources overall, which results in less network congestion and thus improved reduced quality and/or reliability of communications within the serving cell that includes the base station 110. Additionally, in some aspects, the base station 110 may indicate a cell quantity threshold to further reduce a frequency of transmitting reports, which conserves additional power and processing resources at the UE 120.

As indicated above, FIG. 5 is provided as an example. Other examples may differ from what is described with respect to FIG. 5.

Figure 6:
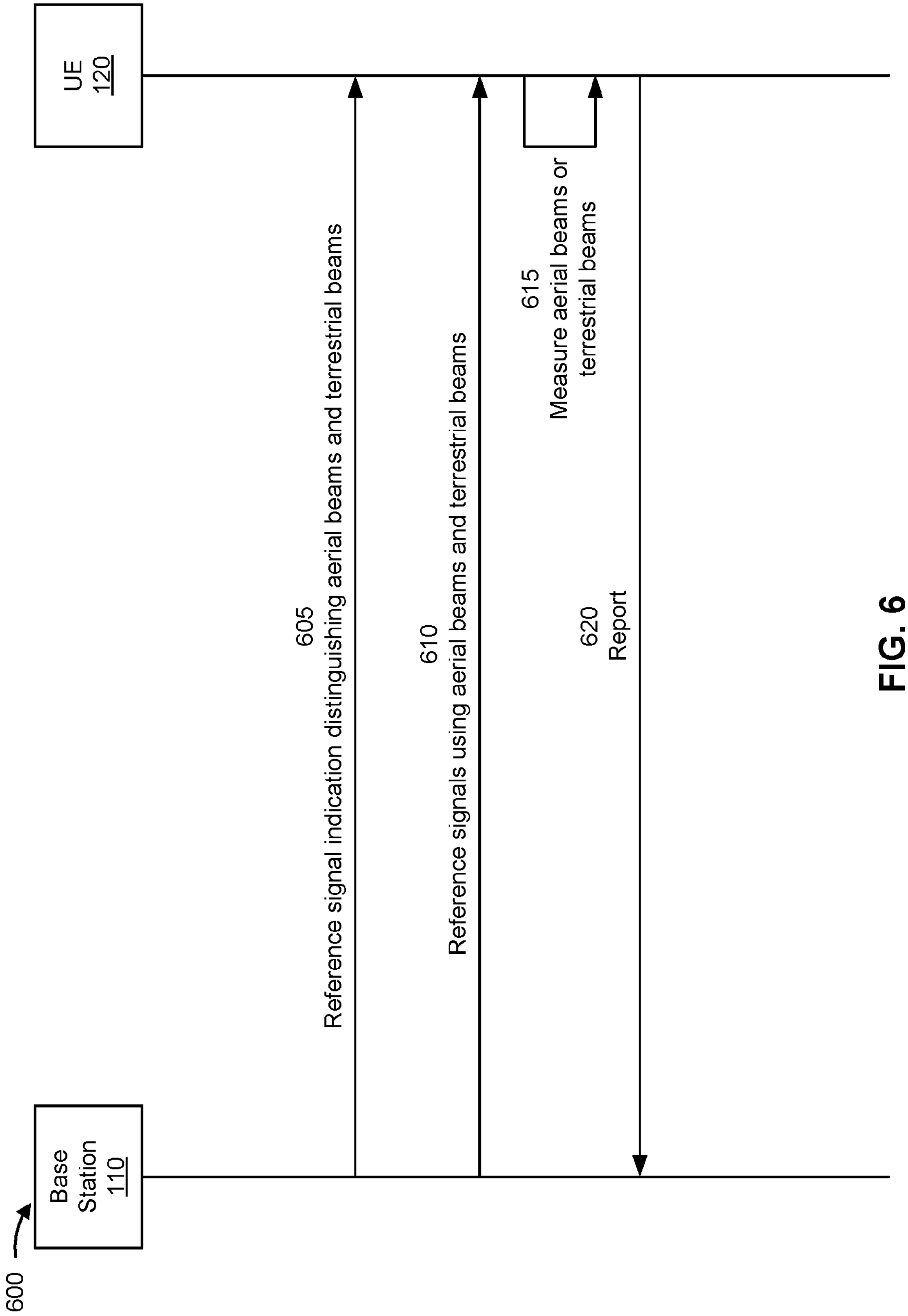
FIG. 6 is a diagram illustrating an example associated with uptilt reference signals indicated separately from downtilt reference signals, in accordance with the present disclosure.

FIG. 6 is a diagram illustrating an example 600 associated with uptilt reference signals indicated separately from downtilt reference signals, in accordance with the present disclosure. As shown in FIG. 6, a base station 110 and a UE 120 may communicate with one another (e.g., on a wireless network, such as wireless network 100 of FIG. 1).

As shown in connection with reference number 605, the base station 110 may transmit, and the UE 120 may receive, an indication of a first set of reference signals and an indication of a first subset, of the first set of reference signals, that is associated with one or more uptilt antennas. In some aspects, the uptilt antenna(s) may be associated with the base station 110, and the first set of reference signals may be associated with a serving cell including the base station 110. Accordingly, the base station 110 may transmit an ssb-PositionsInBurst data structure to indicate the first set of reference signals, as defined in 3GPP specifications and/or another standard. Although the description herein focuses on the ssb-PositionsInBurst data structure, the description similarly applies to other data structures. Additionally, the base station 110 may additionally transmit an ssb-PositionsInBurst-Aerial data structure to indicate the first subset of reference signals, as defined in 3GPP specifications and/or another standard. Although the description herein focuses on the ssb-PositionsInBurst-Aerial data structure, the description similarly applies to other data structures.

In some aspects, the UE 120 may determine that one or more remaining reference signals, of the first set of reference signals and not in the first subset, are associated with one or more downtilt antennas. Additionally, or alternatively, the base station 110 may transmit an ssb-PositiomInBurst-Terrestrial data structure to indicate a second subset, of the first set of reference signals, that is associated with one or more downtilt antennas. In some aspects, the downtilt antenna(s) may be associated with the base station 110, and the first set of reference signals may be associated with the serving cell including the base station 110. Accordingly, in some aspects, the UE 120 may determine that one or more remaining reference signals, of the first set of reference signals and not in the second subset, are associated with one or more uptilt antennas.

In some aspects, the indication of the first set of reference signals may include a first plurality of bits. For example, the ssb-PositionsInBurst data structure may include a bitmap indicating which, of a preconfigured set of beams (e.g., according to 3GPP specifications and/or another standard) the base station 110 is using. In one example, the bitmap may include 10110110 to indicate that a first, third, fourth, sixth, and seventh beam, out of eight preconfigured beams, are transmitted by the base station 110. Additionally, the indication of the first subset of the first set of reference signals may include a second plurality of bits. For example, the ssb-PositionsInBurst-Aerial data structure may include a bitmap indicating which, of the preconfigured set of beams, the base station 110 is using with one or more uptilt antennas. Accordingly, the second plurality of bits may include a set of activated bits that is a subset of a set of activated bits included in the first plurality of bits. In one example, the bitmap may include 00000110 to indicate that the sixth and seventh beam, out of the eight preconfigured beams, are transmitted by the uptilt antenna(s) associated with the base station 110. Accordingly, the UE 120 may measure reference signals associated with aerial beams and/or associated with terrestrial beams, from the base station 110, based at least in part on the indications.

Additionally, or alternatively, the base station 110 may transmit, and the UE 120 may receive, an indication of a second set of reference signals associated with a cell that neighbors the serving cell, and an indication of a third subset, of the second set of reference signals, that is associated with one or more uptilt antennas. Accordingly, the base station 110 may transmit an ssb-ToMeasure data structure to indicate the second set of reference signals, as defined in 3GPP specifications and/or another standard. Although the description herein focuses on the ssb-ToMeasure data structure, the description similarly applies to other data structures. Additionally, the base station 110 may additionally transmit an ssb-ToMeasure-Aerial data structure to indicate the third subset of reference signals, as defined in 3GPP specifications and/or another standard. Although the description herein focuses on the ssb-ToMeasure-Aerial data structure, the description similarly applies to other data structures.

In some aspects, the UE 120 may determine that one or more remaining reference signals, of the second set of reference signals and not in the third subset, are associated with one or more downtilt antennas. Additionally, or alternatively, the base station 110 may transmit an ssb-ToMeasure-Terrestrial data structure to indicate a fourth subset, of the second set of reference signals, that is associated with one or more downtilt antennas. In some aspects, the downtilt antenna(s) may be associated with the cell that neighbors the serving cell. Accordingly, in some aspects, the UE 120 may determine that one or more remaining reference signals, of the second set of reference signals and not in the fourth subset, are associated with one or more uptilt antennas.

In some aspects, the indication of the second set of reference signals may include a third plurality of bits. For example, the ssb-ToMeasure data structure may include a bitmap indicating which, of a preconfigured set of beams (e.g., according to 3GPP specifications and/or another standard) one or more cells, that neighbor the serving cell, are using. In one example, the bitmap may include 10110110 to indicate that a first, third, fourth, sixth, and seventh beam, out of eight preconfigured beams, are transmitted by the neighboring cell(s). Additionally, the indication of the third subset of the second set of reference signals may include a fourth plurality of bits. For example, the ssb-ToMeasure-Aerial data structure may include a bitmap indicating which, of the preconfigured set of beams, the neighboring cell(s) are using one or more uptilt antennas. Accordingly, the fourth plurality of bits may include a set of activated bits that is a subset of a set of activated bits included in the third plurality of bits. In one example, the bitmap may include 00000110 to indicate that the sixth and seventh beam, out of the eight preconfigured beams, are transmitted by the uptilt antenna(s) associated with the neighboring cell(s). Accordingly, the UE 120 may measure reference signals associated with aerial beams and/or associated with terrestrial beams, from the neighboring cell(s), based at least in part on the indications.

In some aspects, the base station 110 may additionally or alternatively transmit, and the UE 120 may receive, an indication of a set of cells that neighbor the serving cell including the base station 110. Accordingly, the base station 110 may transmit an intraFreqNeighCellList data structure and/or an interFreqCarrierFreqList data structure to indicate the set of cells, as defined in 3GPP specifications and/or another standard. Although the description herein focuses on the intraFreqNeighCellList data structure and the interFreqCarrierFreqList data structure, the description similarly applies to other data structures. Additionally, base station 110 may transmit, and the UE 120 may receive, an indication of a first subset, of the set of cells, that is associated with transmitting uptilt beams. For example, the base station 110 may transmit an intraFreqNeighCellList-Aerial data structure and/or an interFreqCarrierFreqList-Aerial data structure to indicate the first subset of cells, as defined in 3GPP specifications and/or another standard. Although the description herein focuses on the intraFreqNeighCellList-Aerial data structure and the interFreqCarrierFreqList-Aerial data structure, the description similarly applies to other data structures.

In some aspects, the UE 120 may determine that one or more remaining cells, of the set of cells and not in the subset, are not associated with transmitting uptilt beams. Additionally, or alternatively, the base station 110 may transmit an intraFreqNeighCellList-Terrestrial data structure and/or an interFreqCarrierFreqList-Terrestrial data structure to indicate a second subset, of the set of cells, that is not associated with transmitting uptilt beams. Accordingly, in some aspects, the UE 120 may determine that one or more remaining cells, of the set of cells and not in the second subset, are associated with transmitting uptilt beams.

In some aspects, the base station 110 may additionally or alternatively transmit, and the UE 120 may receive, an indication of a first maximum associated with the first set of reference signals (and/or the second set of reference signals). For example, the base station 110 may transmit an maxReportCells variable to indicate a maximum quantity of cells and/or a ma=NrofRS-IndexesToReport variable to indicate a maximum quantity of beams, as defined in 3GPP specifications and/or another standard. Although the description herein focuses on the maxReportCells variable and the maxNrofRS-IndexesToReport variable, the description similarly applies to other data structures. Additionally, the base station 110 may transmit, and the UE 120 may receive, an indication of a second maximum, different than the first maximum and associated with the first subset of reference signals (and/or the third subset of reference signals). For example, the base station 110 may transmit an maxReportCells-Aerial variable to indicate a maximum quantity of cells associated with aerial beams and/or a maxNrofRS-IndexesToReport-Aerial variable to indicate a maximum quantity of beams associated with aerial beams, as defined in 3GPP specifications and/or another standard. Additionally, or alternatively, the base station 110 may transmit an maxReportCells-Terrestrial variable to indicate a maximum quantity of cells associated with terrestrial beams and/or a maxNrofRS-IndexesToReport-Terrestrial variable to indicate a maximum quantity of beams associated with terrestrial beams, as defined in 3GPP specifications and/or another standard.

As shown in connection with reference number 610, the base station 110 may transmit (e.g., broadcast) reference signals. For example, the reference signals may include SSBs, CSI-RSs, and/or other types of reference signals. In some aspects, other base stations associated with the serving cell and/or other base stations associated with other cells may additionally transmit (e.g., broadcast) additional reference signals.

As shown in connection with reference number 615, the UE 120 may measure some or all of the reference signals. In some aspects, the UE 120 may measure some or all of the additional reference signals as well.

In some aspects, the UE 120 may determine that an altitude associated with the UE 120 satisfies an altitude threshold. For example, the UE 120 may use an altimeter, a magnetometer, and/or other hardware to determine the altitude associated with the UE 120. In some aspects, the altitude threshold may be programmed (and/or otherwise preconfigured) in a memory of the UE 120 (e.g., accordingly to 3GPP specifications and/or another standard). Additionally, or alternatively, the base station 110 may transmit, and the UE 120 may receive, an indication of the altitude threshold (e.g., determined according to a height associated with the base station 110 and/or environmental factors, such as one or more heights of trees with a threshold distance of the base station 110). Accordingly, the UE 120 may measure reference signals associated with aerial beams based at least in part on the altitude threshold being satisfied.

As an alternative, the UE 120 may determine that an altitude associated with the UE 120 does not satisfy the altitude threshold. Accordingly, the UE 120 may measure reference signals associated with terrestrial beams based at least in part on the altitude threshold not being satisfied.

As shown in connection with reference number 620, the UE 120 may transmit, and the base station 110 may receive, a report based at least in part on the indications. For example, the report may be based at least in part on measurements of terrestrial reference signals (e.g., not included in the first subset of reference signals). As an alternative, the report may be based at least in part on measurements of aerial reference signals (e.g., included in the first subset of reference signals).

Additionally, or alternatively, the report may be based at least in part on one or more neighboring cells that transmit terrestrial reference signals (e.g., cells not included in the first subset of cells). As an alternative, the report may be based at least in part on one or more neighboring cells that transmit aerial reference signals (e.g., cells included in the first subset of cells).

Additionally, or alternatively, the report may be based at least in part on one or more maxima described above. For example, the UE 120 may select highest measurements, from a set of measurements, to include in the report such that the report does not include more than a maximum quantity of beams and/or a maximum quantity of cells.

As described above, example 600 may be combined with example 500. For example, the base station 110 may transmit a measurement quantity threshold with a beam quantity threshold and/or a cell quantity threshold, as described below in connection with FIG. 5, that the UE 120 uses to determine when to transmit the report based at least in part on measurements of aerial beams (e.g., from the base station 110, another base station included in the serving cell, and/or a base station included in another cell) and/or terrestrial beams. Accordingly, the UE 120 may use the indications, as described in connection with FIG. 6, to distinguish aerial beams from terrestrial beams. Additionally, in some aspects, the UE 120 may apply maxima as described in connection with FIG. 6 to generate the report.

By using techniques as described in connection with FIG. 6, the base station 110 may distinguish aerial beams from terrestrial beams. As a result, the UE 120 may measure reference signals associated with aerial beams and not reference signals associated with terrestrial beams in order to generate and transmit reports less frequently, which conserves power and processing resources. Additionally, the UE 120 uses fewer network resources overall, which results in less network congestion and thus improved reduced quality and/or reliability of communications within a serving cell that includes the base station 110. As an alternative, the UE 120 may measure reference signals associated with terrestrial beams and not reference signals associated with aerial beams in order to conserve power and processing resources. In some aspects, the base station 110 may additionally indicate a beam quantity threshold and/or a cell quantity threshold to further reduce a frequency of transmitting reports, which further conserves power and processing resources at the UE 120.

As indicated above, FIG. 6 is provided as an example. Other examples may differ from what is described with respect to FIG. 6.

Figure 7:
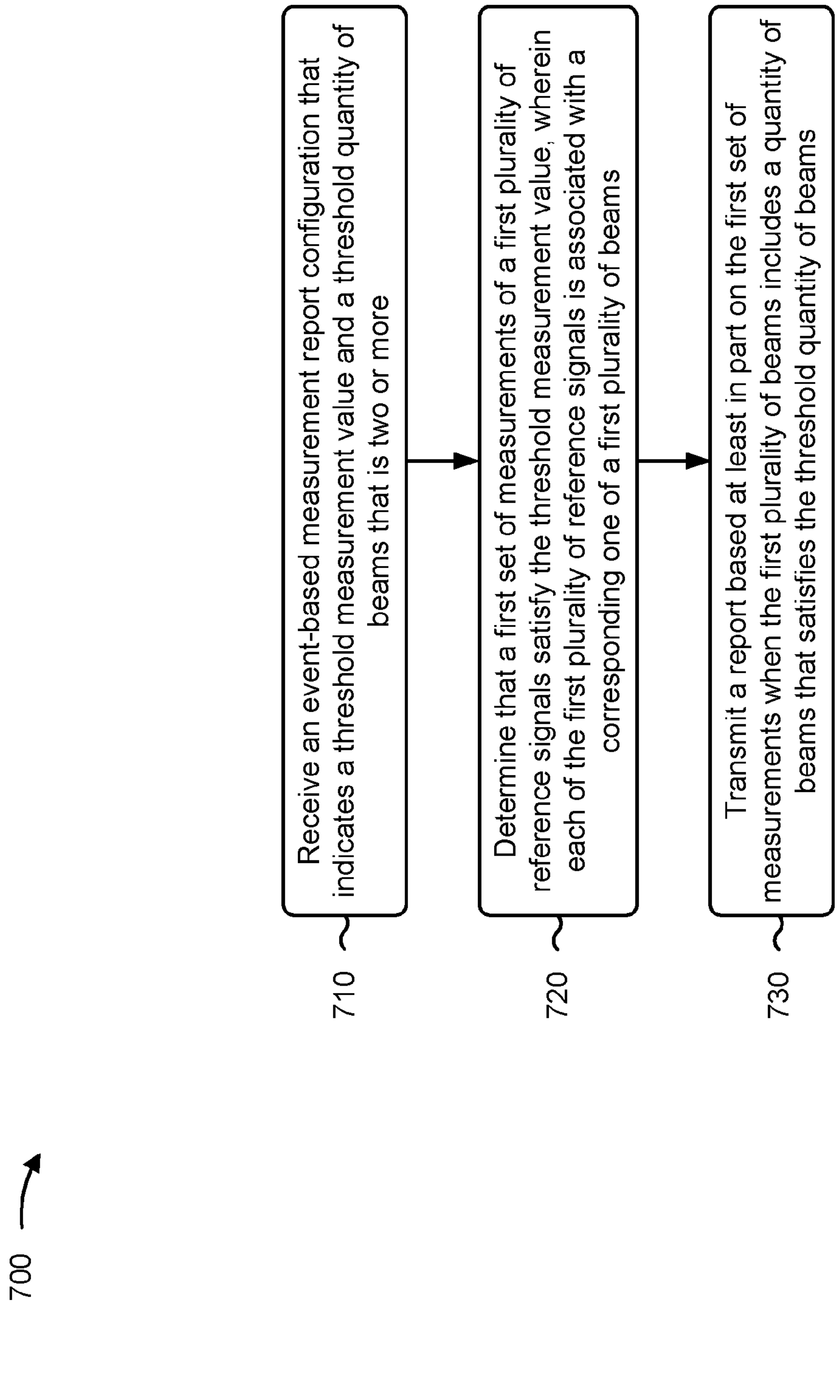
FIGS. 7 and 8 are diagrams illustrating example processes associated with configuring beam-based events for measuring reference signals, in accordance with the present disclosure.

FIG. 7 is a diagram illustrating an example process 700 performed, for example, by a UE, in accordance with the present disclosure. Example process 700 is an example where the UE (e.g., UE 120 and/or apparatus 1100 of FIG. 11) performs operations associated with configuring beam-based events for measuring reference signals.

As shown in FIG. 7, in some aspects, process 700 may include receiving, from a serving cell (e.g., including base station 110 and/or apparatus 1200 of FIG. 12), an event-based measurement report configuration that indicates a measurement threshold and a beam quantity threshold that is two or more (block 710). For example, the UE (e.g., using communication manager 140 and/or reception component 1102, depicted in FIG. 11) may receive, from a serving cell, an event-based measurement report configuration that indicates a measurement threshold and a beam quantity threshold that is two or more, as described herein.

As further shown in FIG. 7, in some aspects, process 700 may include determining that a first set of measurements of a first plurality of reference signals satisfy the measurement threshold (block 720). For example, the UE (e.g., using communication manager 140 and/or determination component 1108, depicted in FIG. 11) may determine that a first set of measurements of a first plurality of reference signals satisfy the measurement threshold, as described herein. In some aspects, each of the first plurality of reference signals is associated with a corresponding one of a first plurality of beams.

As further shown in FIG. 7, in some aspects, process 700 may include transmitting, to the serving cell, a report based at least in part on the first set of measurements when the first plurality of beams includes a quantity of beams that satisfies the beam quantity threshold (block 730). For example, the UE (e.g., using communication manager 140 and/or transmission component 1104, depicted in FIG. 11) may transmit, to the serving cell, a report based at least in part on the first set of measurements when the first plurality of beams includes a quantity of beams that satisfies the beam quantity threshold, as described herein.

Process 700 may include additional aspects, such as any single aspect or any combination of aspects described below and/or in connection with one or more other processes described elsewhere herein.

In a first aspect, the measurement threshold is an RSRP value for L1-level beam measurement.

In a second aspect, alone or in combination with the first aspect, the event-based measurement report configuration further indicates a cell quantity threshold.

In a third aspect, alone or in combination with one or more of the first and second aspects, the cell quantity threshold is two or more.

In a fourth aspect, alone or in combination with one or more of the first through third aspects, the first plurality of beams is associated with one or more first cells, and the report is transmitted when a quantity of the one or more first cells satisfies the cell quantity threshold.

In a fifth aspect, alone or in combination with one or more of the first through fourth aspects, the first plurality of beams is associated with a first cell, and process 700 further includes determining (e.g., using communication manager 140 and/or determination component 1108) that one or more second sets of measurements, of one or more second pluralities of reference signals, satisfy the measurement threshold. Each of the one or more second pluralities of reference signals may be associated with a corresponding one of one or more second pluralities of beams, and each of the one or more second pluralities of beams is associated with a corresponding one of one or more second cells, such that the report is transmitted when a quantity of cells, including the first cell and the one or more second cells, satisfies the cell quantity threshold, and when each of the one or more second pluralities of beams includes a quantity of beams that satisfies the beam quantity threshold.

In a sixth aspect, alone or in combination with one or more of the first through fifth aspects, the first plurality of beams are associated with one or more uptilt antennas, and the measurement threshold is different from an additional measurement threshold that is associated with an additional plurality of beams that are associated with one or more downtilt antennas.

In a seventh aspect, alone or in combination with one or more of the first through sixth aspects, the first plurality of beams are associated with one or more uptilt antennas, and the beam quantity threshold is different from an additional beam quantity threshold that is associated with an additional plurality of beams that are associated with one or more downtilt antennas.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
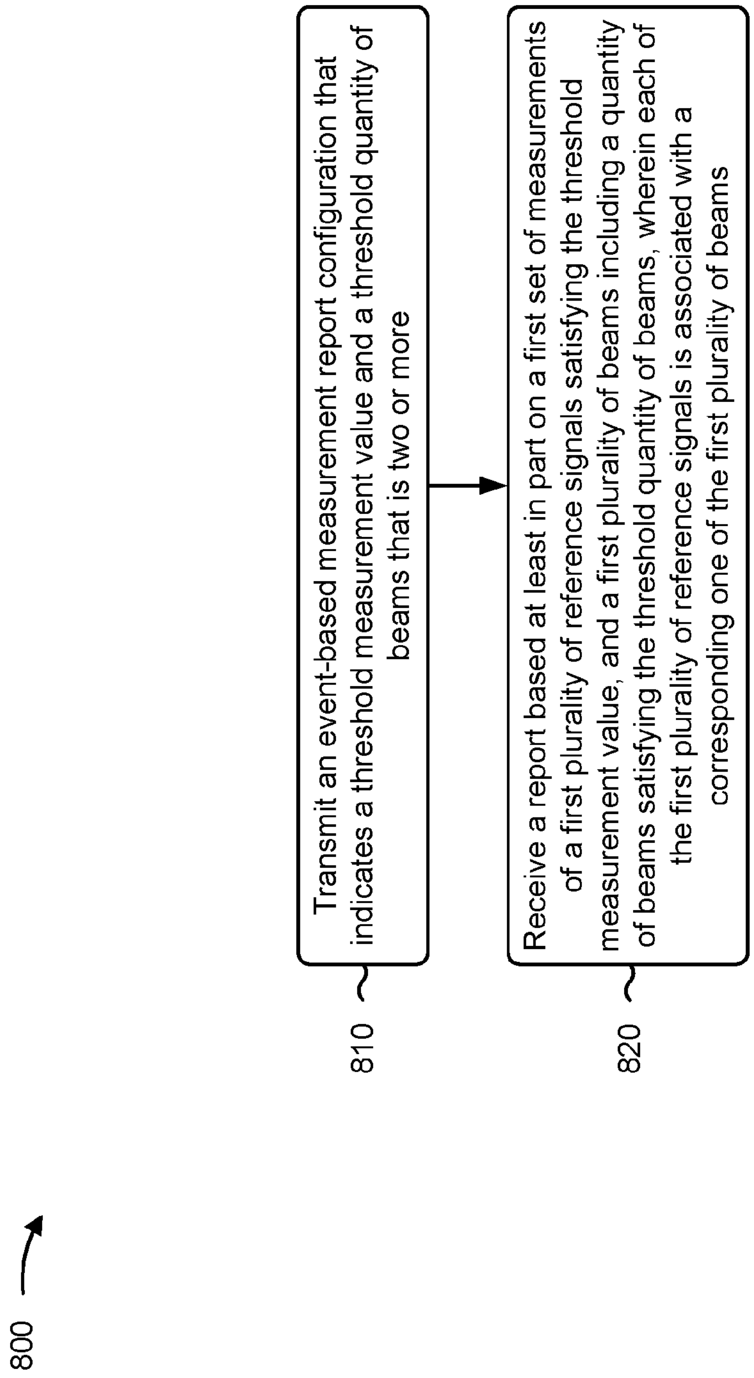

FIG. 8 is a diagram illustrating an example process 800 performed, for example, by a base station, in accordance with the present disclosure. Example process 800 is an example where the base station (e.g., base station 110 and/or apparatus 1200 of FIG. 12) performs operations associated with configuring beam-based events for measuring reference signals.

As shown in FIG. 8, in some aspects, process 800 may include transmitting, to a UE (e.g., UE 120 and/or apparatus 1100 of FIG. 11), an event-based measurement report configuration that indicates a measurement threshold and a beam quantity threshold that is two or more (block 810). For example, the base station (e.g., using communication manager 150 and/or transmission component 1204, depicted in FIG. 12) may transmit, to a UE, an event-based measurement report configuration that indicates a measurement threshold and a beam quantity threshold that is two or more, as described herein.

As further shown in FIG. 8, in some aspects, process 800 may include receiving, from the UE, a report based at least in part on a first set of measurements of a first plurality of reference signals satisfying the measurement threshold, and a first plurality of beams including a quantity of beams satisfying the beam quantity threshold (block 820). For example, the base station (e.g., using communication manager 150 and/or reception component 1202, depicted in FIG. 12) may receive, from the UE, a report based at least in part on a first set of measurements of a first plurality of reference signals satisfying the measurement threshold, and a first plurality of beams including a quantity of beams satisfying the beam quantity threshold, as described herein. In some aspects, each of the first plurality of reference signals is associated with a corresponding one of the first plurality of beams.

Process 800 may include additional aspects, such as any single aspect or any combination of aspects described below and/or in connection with one or more other processes described elsewhere herein.

In a first aspect, the measurement threshold is an RSRP value for L1-level beam measurement.

In a second aspect, alone or in combination with the first aspect, the event-based measurement report configuration further indicates a cell quantity threshold.

In a third aspect, alone or in combination with one or more of the first and second aspects, the cell quantity threshold is two or more.

In a fourth aspect, alone or in combination with one or more of the first through third aspects, the first plurality of beams is associated with one or more first cells, and the report is received when a quantity of the one or more first cells satisfies the cell quantity threshold.

In a fifth aspect, alone or in combination with one or more of the first through fourth aspects, the first plurality of beams is associated with a first cell, and the report is received when one or more second sets of measurements, of one or more second pluralities of reference signals, satisfy the measurement threshold, when each of one or more second pluralities of beams includes a quantity of beams that satisfies the beam quantity threshold, and when a quantity of cells, including the first cell and one or more second cells, satisfies the cell quantity threshold. Each of the one or more second pluralities of reference signals may be associated with a corresponding one of the one or more second pluralities of beams, and each of the one or more second pluralities of beams may be associated with a corresponding one of the one or more second cells.

In a sixth aspect, alone or in combination with one or more of the first through fifth aspects, the first plurality of beams are associated with one or more uptilt antennas, and the measurement threshold is different from an additional measurement threshold that is associated with an additional plurality of beams that are associated with one or more downtilt antennas.

In a seventh aspect, alone or in combination with one or more of the first through sixth aspects, the first plurality of beams are associated with one or more uptilt antennas, and the beam quantity threshold is different from an additional beam quantity threshold that is associated with an additional plurality of beams that are associated with one or more downtilt antennas.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
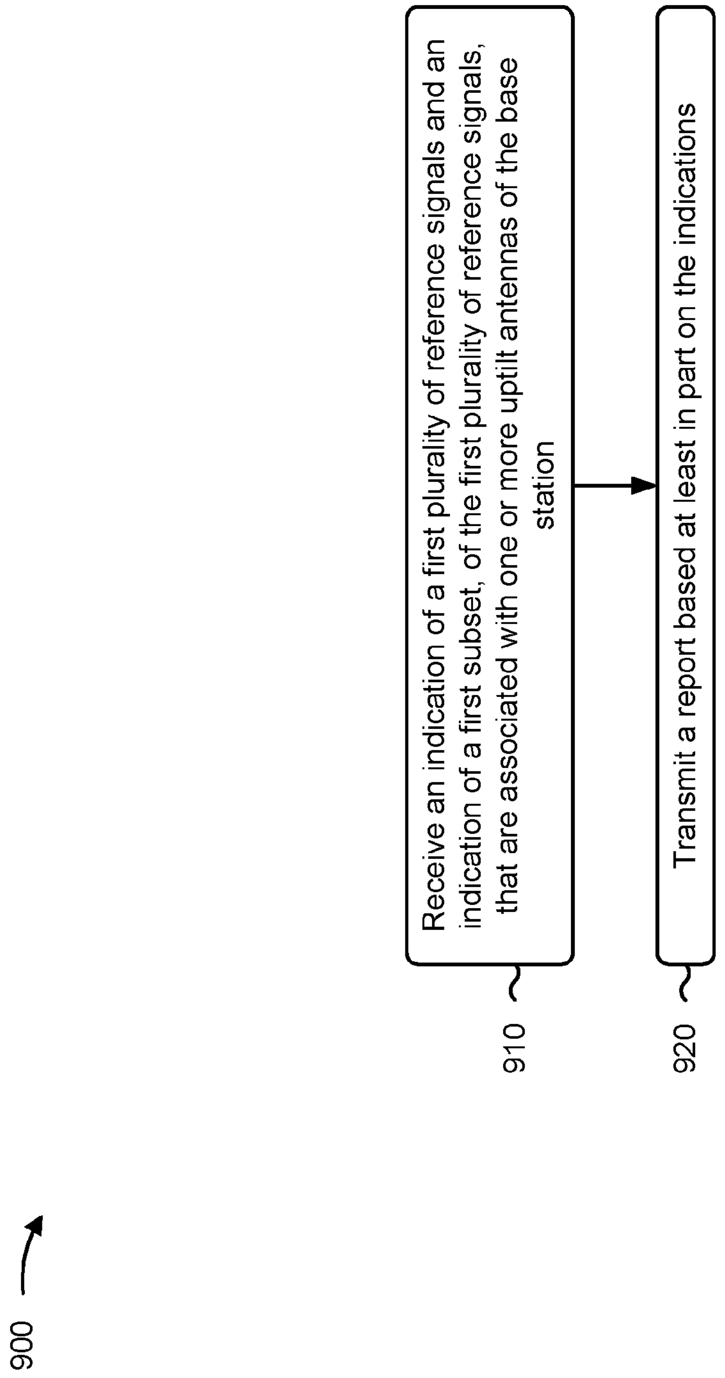
FIGS. 9 and 10 are diagrams illustrating example processes associated with indicating uptilt reference signals separately from downtilt reference signals, in accordance with the present disclosure.

FIG. 9 is a diagram illustrating an example process 900 performed, for example, by a UE, in accordance with the present disclosure. Example process 900 is an example where the UE (e.g., UE 120 and/or apparatus 1100 of FIG. 11) performs operations associated with indicating uptilt reference signals separately from downtilt reference signals.

As shown in FIG. 9, in some aspects, process 900 may include receiving, from a base station (e.g., base station 110 and/or apparatus 1200 of FIG. 12), an indication of a first set of reference signals and an indication of a first subset, of the first set of reference signals, that is associated with one or more uptilt antennas of the base station (block 910). For example, the UE (e.g., using communication manager 140 and/or reception component 1102, depicted in FIG. 11) may receive, from a base station, an indication of a first set of reference signals and an indication of a first subset, of the first set of reference signals, that is associated with one or more uptilt antennas of the base station, as described herein.

As further shown in FIG. 9, in some aspects, process 900 may include transmitting, to the base station, a report based at least in part on the indications (block 920). For example, the UE (e.g., using communication manager 140 and/or transmission component 1104, depicted in FIG. 11) may transmit, to the base station, a report based at least in part on the indications, as described herein.

Process 900 may include additional aspects, such as any single aspect or any combination of aspects described below and/or in connection with one or more other processes described elsewhere herein.

In a first aspect, process 900 further includes receiving (e.g., using communication manager 140 and/or reception component 1102), from the base station, an event-based measurement report configuration that indicates a measurement threshold and a beam quantity threshold, and determining (e.g., using communication manager 140 and/or determination component 1108, depicted in FIG. 11) that a first set of measurements of one or more of the first subset of reference signals satisfy the measurement threshold. The report may be transmitted when a quantity of a first plurality of beams, that are associated with the one or more of the first subset of reference signals, includes a quantity of beams that satisfies the beam quantity threshold.

In a second aspect, alone or in combination with the first aspect, the beam quantity threshold is two or more.

In a third aspect, alone or in combination with one or more of the first and second aspects, the event-based measurement report configuration further indicates a cell quantity threshold.

In a fourth aspect, alone or in combination with one or more of the first through third aspects, the cell quantity threshold is two or more.

In a fifth aspect, alone or in combination with one or more of the first through fourth aspects, the first plurality of beams is associated with one or more first cells, and the report is transmitted when a quantity of the one or more first cells satisfies the cell quantity threshold.

In a sixth aspect, alone or in combination with one or more of the first through fifth aspects, the first plurality of beams is associated with a first cell, and process 900 further includes determining (e.g., using communication manager 140 and/or determination component 1108) that one or more second sets of measurements, of one or more second subsets of one or more second sets of reference signals, satisfy the measurement threshold. Each of the one or more second subsets of reference signals may be associated with a corresponding one of one or more second pluralities of beams, and each of the one or more second pluralities of beams may be associated with a corresponding one of one or more second cells, such that the report is transmitted when a quantity of cells, including the first cell and the one or more second cells, satisfies the cell quantity threshold, and when each of the one or more second pluralities of beams includes a quantity of beams that satisfies the beam quantity threshold.

In a seventh aspect, alone or in combination with one or more of the first through sixth aspects, the indication of the first subset of the first set of reference signals is associated with a serving cell including the base station.

In an eighth aspect, alone or in combination with one or more of the first through seventh aspects, the indication of the first subset of the first set of reference signals is associated with a cell that neighbors a serving cell including the base station.

In a ninth aspect, alone or in combination with one or more of the first through eighth aspects, the indication of the first set of reference signals includes a first plurality of bits, the indication of the first subset of the first set of reference signals includes a second plurality of bits, and the second plurality of bits includes a set of activated bits that is a subset of a set of activated bits included in the first plurality of bits.

In a tenth aspect, alone or in combination with one or more of the first through ninth aspects, process 900 further includes receiving (e.g., using communication manager 140 and/or reception component 1102), from the base station, an indication of a set of cells that neighbor a serving cell including the base station, and an indication of a subset, of the set of cells, that is associated with transmitting uptilt beams.

In an eleventh aspect, alone or in combination with one or more of the first through tenth aspects, process 900 further includes receiving (e.g., using communication manager 140 and/or reception component 1102), from the base station, an indication of a first maximum associated with the first set of reference signals and of a second maximum, different than the first maximum, associated with the first subset of the first set of reference signals, such that the report is based at least in part on the first maximum or the second maximum.

In a twelfth aspect, alone or in combination with one or more of the first through eleventh aspects, process 900 further includes determining (e.g., using communication manager 140 and/or determination component 1108) that an altitude associated with the UE satisfies an altitude threshold, such that the report is based at least in part on measurements of one or more of the first set of reference signals not included in the first subset.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
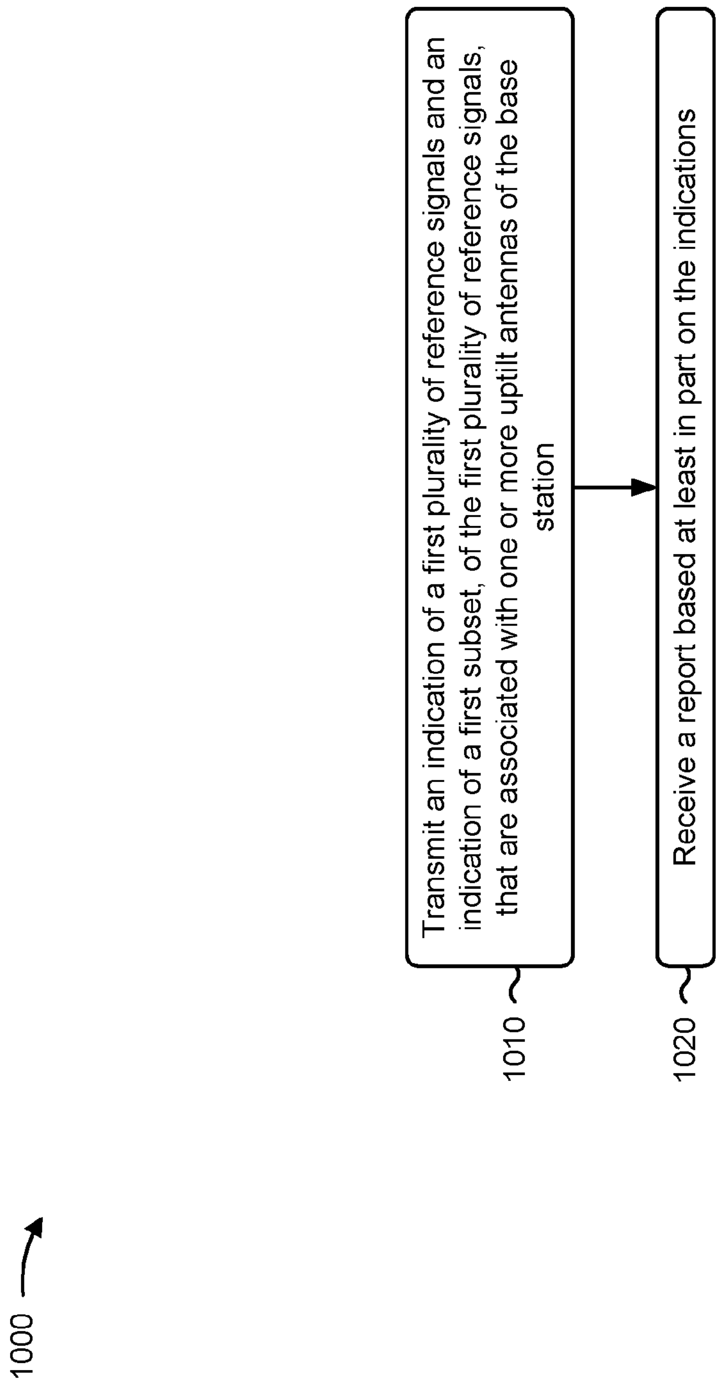

FIG. 10 is a diagram illustrating an example process 1000 performed, for example, by a base station, in accordance with the present disclosure. Example process 1000 is an example where the base station (e.g., base station 110 and/or apparatus 1200 of FIG. 12) performs operations associated with indicating uptilt reference signals separately from downtilt reference signals.

As shown in FIG. 10, in some aspects, process 1000 may include transmitting, to a UE (e.g., UE 120 and/or apparatus 1100 of FIG. 11), an indication of a first set of reference signals and an indication of a first subset, of the first set of reference signals, that is associated with one or more uptilt antennas of the base station (block 1010). For example, the base station (e.g., using communication manager 150 and/or transmission component 1204, depicted in FIG. 12) may transmit, to a UE, an indication of a first set of reference signals and an indication of a first subset, of the first set of reference signals, that is associated with one or more uptilt antennas of the base station, as described herein.

As further shown in FIG. 10, in some aspects, process 1000 may include receiving, from the UE, a report based at least in part on the indications (block 1020). For example, the base station (e.g., using communication manager 150 and/or reception component 1202, depicted in FIG. 12) may receive, from the UE, a report based at least in part on the indications, as described herein.

Process 1000 may include additional aspects, such as any single aspect or any combination of aspects described below and/or in connection with one or more other processes described elsewhere herein.

In a first aspect, process 1000 further includes transmitting (e.g., using communication manager 150 and/or transmission component 1204), to the UE, an event-based measurement report configuration that indicates a measurement threshold and a beam quantity threshold, such that the report is received when a first set of measurements of one or more of the first subset of reference signals satisfy the measurement threshold and when a quantity of a first plurality of beams, that are associated with the one or more of the first subset of reference signals, includes a quantity of beams that satisfies the beam quantity threshold.

In a second aspect, alone or in combination with the first aspect, the beam quantity threshold is two or more.

In a third aspect, alone or in combination with one or more of the first and second aspects, the event-based measurement report configuration further indicates a cell quantity threshold.

In a fourth aspect, alone or in combination with one or more of the first through third aspects, the cell quantity threshold is two or more.

In a fifth aspect, alone or in combination with one or more of the first through fourth aspects, the first plurality of beams is associated with one or more first cells, and the report is received when a quantity of the one or more first cells satisfies the cell quantity threshold.

In a sixth aspect, alone or in combination with one or more of the first through fifth aspects, the first plurality of beams is associated with a first cell, and the report is received when one or more second sets of measurements, of one or more second subsets of one or more second sets of reference signals, satisfy the measurement threshold, when a quantity of cells, including the first cell and one or more second cells, satisfies the cell quantity threshold, and when each of one or more second pluralities of beams includes a quantity of beams that satisfies the beam quantity threshold. Each of the one or more second subsets of reference signals may be associated with a corresponding one of the one or more second pluralities of beams, and each of the one or more second pluralities of beams may be associated with a corresponding one of the one or more second cells.

In a seventh aspect, alone or in combination with one or more of the first through sixth aspects, the indication of the first subset of the first set of reference signals is associated with a serving cell including the base station.

In an eighth aspect, alone or in combination with one or more of the first through seventh aspects, the indication of the first subset of the first set of reference signals is associated with a cell that neighbors a serving cell including the base station.

In a ninth aspect, alone or in combination with one or more of the first through eighth aspects, the indication of the first set of reference signals includes a first plurality of bits, the indication of the first subset of the first set of reference signals includes a second plurality of bits, and the second plurality of bits includes a set of activated bits that is a subset of a set of activated bits included in the first plurality of bits.

In a tenth aspect, alone or in combination with one or more of the first through ninth aspects, process 1000 further includes transmitting (e.g., using communication manager 150 and/or transmission component 1204), to the UE, an indication of a list of cells that neighbor a serving cell including the base station, and an indication of a subset, of the list of cells, that is associated with transmitting uptilt beams.

In an eleventh aspect, alone or in combination with one or more of the first through tenth aspects, process 1000 further includes transmitting (e.g., using communication manager 150 and/or transmission component 1204), to the UE, an indication of a first maximum associated with the first set of reference signals and of a second maximum, different than the first maximum, associated with the first subset of the first set of reference signals, such that the report is based at least in part on the first maximum or the second maximum.

In a twelfth aspect, alone or in combination with one or more of the first through eleventh aspects, process 1000 further includes transmitting (e.g., using communication manager 150 and/or transmission component 1204), to the UE, an indication of an altitude threshold, such that the report is based at least in part on measurements of one or more of the first set of reference signals not included in the first subset.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of a determination component 1108 or a measurement component 1110, among other examples.

In some aspects, the apparatus 1100 may be configured to perform one or more operations described herein in connection with FIGS. 3-6. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

In some aspects, the reception component 1102 may receive, from a serving cell (e.g., including apparatus 1106), an event-based measurement report configuration that indicates a measurement threshold and a beam quantity threshold that is two or more. Accordingly, the determination component 1108 may determine that a first set of measurements of a first plurality of reference signals satisfy the measurement threshold, where each of the first plurality of reference signals is associated with a corresponding one of a first plurality of beams. In some aspects, the determination component 1108 may include a modem, a modulator, a demodulator, a transmit MIMO processor, a transmit processor, a MIMO detector, a receive processor, a controller/processor, a memory, or a combination thereof, of the UE described in connection with FIG. 2. For example, the measurement component 1110 may perform the first set of measurements of the first plurality of reference signals. In some aspects, the measurement component 1110 may include one or more antennas, a modem, a demodulator, a MIMO detector, a receive processor, a controller/processor, a memory, or a combination thereof, of the UE described in connection with FIG. 2. The transmission component 1104 may therefore transmit, to the serving cell, a report based at least in part on the first set of measurements when the first plurality of beams includes a quantity of beams that satisfies the beam quantity threshold.

Additionally, or alternatively, the reception component 1102 may receive (e.g., from the apparatus 1106) an indication of a first set of reference signals and an indication of a first subset, of the first set of reference signals, that is associated with one or more uptilt antennas of the base station. Accordingly, the transmission component 1104 may transmit (e.g., to the apparatus 1106) a report based at least in part on the indications. In some aspects, the reception component 1102 may additionally receive (e.g., from the apparatus 1106) an event-based measurement report configuration that indicates a measurement threshold and a beam quantity threshold (e.g., as described above). Accordingly, the determination component 1108 may determine that a first set of measurements of one or more of the first subset of reference signals satisfy the measurement threshold (e.g., as described above) such that the transmission component 1104 transmits the report when a quantity of a first plurality of beams, that are associated with the one or more of the first subset of reference signals, includes a quantity of beams that satisfies the beam quantity threshold.

In some aspects, the reception component 1102 may additionally or alternatively receive (e.g., from the apparatus 1106) an indication of a set of cells that neighbor a serving cell including the base station, and an indication of a subset, of the set of cells, that is associated with transmitting uptilt beams. The reception component 1102 may additionally or alternatively receive (e.g., from the apparatus 1106) an indication of a first maximum associated with the first set of reference signals and of a second maximum, different than the first maximum, associated with the first subset of the first set of reference signals. Accordingly, the transmission component 1104 may transmit the report based at least in part on the first maximum or the second maximum.

In some aspects, the determination component 1108 may determine that an altitude associated with the apparatus 1100 satisfies an altitude threshold such that the transmission component 1104 transmits the report based at least in part on measurements of one or more of the first set of reference signals not included in the first subset.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a neighbor cell communication component 1208, among other examples.

In some aspects, the apparatus 1200 may be configured to perform one or more operations described herein in connection with FIGS. 3-6. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

In some aspects, the transmission component 1204 may transmit (e.g., to the apparatus 1206) an event-based measurement report configuration that indicates a measurement threshold and a beam quantity threshold that is two or more. Accordingly, the reception component 1202 may receive (e.g., from the apparatus 1206) a report based at least in part on a first set of measurements of a first plurality of reference signals satisfying the measurement threshold, and a first plurality of beams including a quantity of beams satisfying the beam quantity threshold, where each of the first plurality of reference signals is associated with a corresponding one of the first plurality of beams. In some aspects, the transmission component 1204 may transmit (e.g., to the apparatus 1206 and/or via broadcast) the first plurality of reference signals.

Additionally, or alternatively, the transmission component 1204 may transmit (e.g., to the apparatus 1206) an indication of a first set of reference signals and an indication of a first subset, of the first set of reference signals, that is associated with one or more uptilt antennas of the base station. Accordingly, the reception component 1202 may receive (e.g., from the apparatus 1206) a report based at least in part on the indications. In some aspects, the transmission component 1204 may additionally transmit (e.g., to the apparatus 1206) an event-based measurement report configuration that indicates a measurement threshold and a beam quantity threshold (e.g., as described above) such that the reception component 1202 receives the report when a first set of measurements of one or more of the first subset of reference signals satisfy the measurement threshold and when a quantity of a first plurality of beams, that are associated with the one or more of the first subset of reference signals, includes a quantity of beams that satisfies the beam quantity threshold.

In some aspects, the transmission component 1204 may transmit (e.g., to the apparatus 1206) an indication of a list of cells that neighbor a serving cell including the apparatus 1200, and an indication of a subset, of the list of cells, that is associated with transmitting uptilt beams. For example, the neighbor cell communication component 1208 may receive an indication, from each cell that neighbor the serving cell, whether the cell transmits uptilt beams. In some aspects, the neighbor cell communication component 1208 may include one or more antennas, a modem, a demodulator, a MIMO detector, a receive processor, a controller/processor, a memory, or a combination thereof, of the base station described in connection with FIG. 2.

In some aspects, the transmission component 1204 may additionally or alternatively transmit (e.g., to the apparatus 1206) an indication of a first maximum associated with the first set of reference signals and of a second maximum, different than the first maximum, associated with the first subset of the first set of reference signals. Accordingly, the report may be based at least in part on the first maximum or the second maximum.

In some aspects, the transmission component 1204 may additionally or alternatively transmit (e.g., to the apparatus 1206) an indication of an altitude threshold, such that the report is based at least in part on measurements of one or more of the first set of reference signals not included in the first subset.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a serving cell, an event-based measurement report configuration that indicates a measurement threshold and a beam quantity threshold that is two or more; determining that a first set of measurements of a first plurality of reference signals satisfy the measurement threshold, wherein each of the first plurality of reference signals is associated with a corresponding one of a first plurality of beams; and transmitting, to the serving cell, a report based at least in part on the first set of measurements when the first plurality of beams includes a quantity of beams that satisfies the beam quantity threshold.

Aspect 2: The method of Aspect 1, wherein the measurement threshold is a reference signal received power (RSRP) value for L1-level beam measurement.

Aspect 3: The method of any of Aspects 1 through 2, wherein the event-based measurement report configuration further indicates a cell quantity threshold.

Aspect 4: The method of Aspect 3, wherein the cell quantity threshold is two or more.

Aspect 5: The method of any of Aspects 3 through 4, wherein the first plurality of beams is associated with one or more first cells, and the report is transmitted when a quantity of the one or more first cells satisfies the cell quantity threshold.

Aspect 6: The method of any of Aspects 3 through 4, wherein the first plurality of beams is associated with a first cell, and wherein the method further comprises: determining that one or more second sets of measurements, of one or more second pluralities of reference signals, satisfy the measurement threshold, wherein each of the one or more second pluralities of reference signals is associated with a corresponding one of one or more second pluralities of beams, and wherein each of the one or more second pluralities of beams is associated with a corresponding one of one or more second cells, wherein the report is transmitted when a quantity of cells, including the first cell and the one or more second cells, satisfies the cell quantity threshold, and when each of the one or more second pluralities of beams includes a quantity of beams that satisfies the beam quantity threshold.

Aspect 7: The method of any of Aspects 1 through 6, wherein the first plurality of beams are associated with one or more uptilt antennas, and the measurement threshold is different from an additional measurement threshold that is associated with an additional plurality of beams that are associated with one or more downtilt antennas.

Aspect 8: The method of any of Aspects 1 through 7, wherein the first plurality of beams are associated with one or more uptilt antennas, and the beam quantity threshold is different from an additional beam quantity threshold that is associated with an additional plurality of beams that are associated with one or more downtilt antennas.

Aspect 9: A method of wireless communication performed by a base station, comprising: transmitting, to a user equipment (UE), an event-based measurement report configuration that indicates a measurement threshold and a beam quantity threshold that is two or more; and receiving, from the UE, a report based at least in part on a first set of measurements of a first plurality of reference signals satisfying the measurement threshold, and a first plurality of beams including a quantity of beams satisfying the beam quantity threshold, wherein each of the first plurality of reference signals is associated with a corresponding one of the first plurality of beams.

Aspect 10: The method of Aspect 9, wherein the measurement threshold is a reference signal received power (RSRP) value for L1-level beam measurement.

Aspect 11: The method of any of Aspects 9 through 10, wherein the event-based measurement report configuration further indicates a cell quantity threshold.

Aspect 12: The method of Aspect 11, wherein the cell quantity threshold is two or more.

Aspect 13: The method of any of Aspects 11 through 12, wherein the first plurality of beams is associated with one or more first cells, and the report is received when a quantity of the one or more first cells satisfies the cell quantity threshold.

Aspect 14: The method of any of Aspects 11 through 12, wherein the first plurality of beams is associated with a first cell, and wherein the report is received when one or more second sets of measurements, of one or more second pluralities of reference signals, satisfy the measurement threshold, when each of one or more second pluralities of beams includes a quantity of beams that satisfies the beam quantity threshold, and when a quantity of cells, including the first cell and one or more second cells, satisfies the cell quantity threshold, wherein each of the one or more second pluralities of reference signals is associated with a corresponding one of the one or more second pluralities of beams, and wherein each of the one or more second pluralities of beams is associated with a corresponding one of the one or more second cells.

Aspect 15: The method of any one of Aspects 9 through 14, wherein the first plurality of beams are associated with one or more uptilt antennas, and the measurement threshold is different from an additional measurement threshold that is associated with an additional plurality of beams that are associated with one or more downtilt antennas.

Aspect 16: The method of any of Aspects 9 through 15, wherein the first plurality of beams are associated with one or more uptilt antennas, and the beam quantity threshold is different from an additional beam quantity threshold that is associated with an additional plurality of beams that are associated with one or more downtilt antennas.

Aspect 17: A method of wireless communication performed by a user equipment (UE), comprising: receiving, from a base station, an indication of a first set of reference signals and an indication of a first subset, of the first set of reference signals, that is associated with one or more uptilt antennas of the base station; and transmitting, to the base station, a report based at least in part on the indications.

Aspect 18: The method of Aspect 17, further comprising: receiving, from the base station, an event-based measurement report configuration that indicates a measurement threshold and a beam quantity threshold; and determining that a first set of measurements of one or more of the first subset of reference signals satisfy the measurement threshold, wherein the report is transmitted when a quantity of a first plurality of beams, that are associated with the one or more of the first subset of reference signals, includes a quantity of beams that satisfies the beam quantity threshold.

Aspect 19: The method of Aspect 18, wherein the beam quantity threshold is two or more.

Aspect 20: The method of any of Aspects 18 through 19, wherein the event-based measurement report configuration further indicates a cell quantity threshold.

Aspect 21: The method of Aspect 20, wherein the cell quantity threshold is two or more.

Aspect 22: The method of any of Aspects 20 through 21, wherein the first plurality of beams is associated with one or more first cells, and the report is transmitted when a quantity of the one or more first cells satisfies the cell quantity threshold.

Aspect 23: The method of any of Aspects 20 through 21, wherein the first plurality of beams is associated with a first cell, and wherein the method further comprises: determining that one or more second sets of measurements, of one or more second subsets of one or more second sets of reference signals, satisfy the measurement threshold, wherein each of the one or more second subsets of reference signals is associated with a corresponding one of one or more second pluralities of beams, and wherein each of the one or more second pluralities of beams is associated with a corresponding one of one or more second cells, wherein the report is transmitted when a quantity of cells, including the first cell and the one or more second cells, satisfies the cell quantity threshold, and when each of the one or more second pluralities of beams includes a quantity of beams that satisfies the beam quantity threshold.

Aspect 24: The method of any of Aspects 17 through 23, wherein the indication of the first subset of the first set of reference signals is associated with a serving cell including the base station.

Aspect 25: The method of any of Aspects 17 through 23, wherein the indication of the first subset of the first set of reference signals is associated with a cell that neighbors a serving cell including the base station.

Aspect 26: The method of any of Aspects 17 through 25, wherein the indication of the first set of reference signals includes a first plurality of bits, the indication of the first subset of the first set of reference signals includes a second plurality of bits, and the second plurality of bits includes a set of activated bits that is a subset of a set of activated bits included in the first plurality of bits.

Aspect 27: The method of any of Aspects 17 through 26, further comprising: receiving, from the base station, an indication of a set of cells that neighbor a serving cell including the base station, and an indication of a subset, of the set of cells, that is associated with transmitting uptilt beams.

Aspect 28: The method of any of Aspects 17 through 27, further comprising: receiving, from the base station, an indication of a first maximum associated with the first set of reference signals and of a second maximum, different than the first maximum, associated with the first subset of the first set of reference signals, wherein the report is based at least in part on the first maximum or the second maximum.

Aspect 29: The method of any of Aspects 17 through 28, further comprising: determining that an altitude associated with the UE satisfies an altitude threshold, wherein the report is based at least in part on measurements of one or more of the first set of reference signals not included in the first subset.

Aspect 30: A method of wireless communication performed by a base station, comprising: transmitting, to a user equipment (UE), an indication of a first set of reference signals and an indication of a first subset, of the first set of reference signals, that is associated with one or more uptilt antennas of the base station; and receiving, from the UE, a report based at least in part on the indications.

Aspect 31: The method of Aspect 30, further comprising: transmitting, to the UE, an event-based measurement report configuration that indicates a measurement threshold and a beam quantity threshold, wherein the report is received when a first set of measurements of one or more of the first subset of reference signals satisfy the measurement threshold and when a quantity of a first plurality of beams, that are associated with the one or more of the first subset of reference signals, includes a quantity of beams that satisfies the beam quantity threshold.

Aspect 32: The method of Aspect 31, wherein the beam quantity threshold is two or more.

Aspect 33: The method of any of Aspects 31 through 32, wherein the event-based measurement report configuration further indicates a cell quantity threshold.

Aspect 34: The method of Aspect 33, wherein the cell quantity threshold is two or more.

Aspect 35: The method of any of Aspects 33 through 34, wherein the first plurality of beams is associated with one or more first cells, and the report is received when a quantity of the one or more first cells satisfies the cell quantity threshold.

Aspect 36: The method of any of Aspects 33 through 34, wherein the first plurality of beams is associated with a first cell, and wherein the report is received when one or more second sets of measurements, of one or more second subsets of one or more second sets of reference signals, satisfy the measurement threshold, when a quantity of cells, including the first cell and one or more second cells, satisfies the cell quantity threshold, and when each of one or more second pluralities of beams includes a quantity of beams that satisfies the beam quantity threshold, wherein each of the one or more second subsets of reference signals is associated with a corresponding one of the one or more second pluralities of beams, and wherein each of the one or more second pluralities of beams is associated with a corresponding one of the one or more second cells.

Aspect 37: The method of any of Aspects 30 through 36, wherein the indication of the first subset of the first set of reference signals is associated with a serving cell including the base station.

Aspect 38: The method of any of Aspects 30 through 36, wherein the indication of the first subset of the first set of reference signals is associated with a cell that neighbors a serving cell including the base station.

Aspect 39: The method of any of Aspects 30 through 38, wherein the indication of the first set of reference signals includes a first plurality of bits, the indication of the first subset of the first set of reference signals includes a second plurality of bits, and the second plurality of bits includes a set of activated bits that is a subset of a set of activated bits included in the first plurality of bits.

Aspect 40: The method of any of Aspects 30 through 39, further comprising: transmitting, to the UE, an indication of a list of cells that neighbor a serving cell including the base station, and an indication of a subset, of the list of cells, that is associated with transmitting uptilt beams.

Aspect 41: The method of any of Aspects 30 through 40, further comprising: transmitting, to the UE, an indication of a first maximum associated with the first set of reference signals and of a second maximum, different than the first maximum, associated with the first subset of the first set of reference signals, wherein the report is based at least in part on the first maximum or the second maximum.

Aspect 42: The method of any of Aspects 30 through 41, further comprising: transmitting, to the UE, an indication of an altitude threshold, wherein the report is based at least in part on measurements of one or more of the first set of reference signals not included in the first subset.

Aspect 43: An apparatus for wireless communication at a device, comprising a processor; memory coupled with the processor; and instructions stored in the memory and executable by the processor to cause the apparatus to perform the method of one or more of Aspects 1-8.

Aspect 44: A device for wireless communication, comprising a memory and one or more processors coupled to the memory, the one or more processors configured to perform the method of one or more of Aspects 1-8.

Aspect 45: An apparatus for wireless communication, comprising at least one means for performing the method of one or more of Aspects 1-8.

Aspect 46: A non-transitory computer-readable medium storing code for wireless communication, the code comprising instructions executable by a processor to perform the method of one or more of Aspects 1-8.

Aspect 47: A non-transitory computer-readable medium storing a set of instructions for wireless communication, the set of instructions comprising one or more instructions that, when executed by one or more processors of a device, cause the device to perform the method of one or more of Aspects 1-8.

Aspect 48: An apparatus for wireless communication at a device, comprising a processor; memory coupled with the processor; and instructions stored in the memory and executable by the processor to cause the apparatus to perform the method of one or more of Aspects 9-16.

Aspect 49: A device for wireless communication, comprising a memory and one or more processors coupled to the memory, the one or more processors configured to perform the method of one or more of Aspects 9-16.

Aspect 50: An apparatus for wireless communication, comprising at least one means for performing the method of one or more of Aspects 9-16.

Aspect 51: A non-transitory computer-readable medium storing code for wireless communication, the code comprising instructions executable by a processor to perform the method of one or more of Aspects 9-16.

Aspect 52: A non-transitory computer-readable medium storing a set of instructions for wireless communication, the set of instructions comprising one or more instructions that, when executed by one or more processors of a device, cause the device to perform the method of one or more of Aspects 9-16.

Aspect 53: An apparatus for wireless communication at a device, comprising a processor; memory coupled with the processor; and instructions stored in the memory and executable by the processor to cause the apparatus to perform the method of one or more of Aspects 17-29.

Aspect 54: A device for wireless communication, comprising a memory and one or more processors coupled to the memory, the one or more processors configured to perform the method of one or more of Aspects 17-29.

Aspect 55: An apparatus for wireless communication, comprising at least one means for performing the method of one or more of Aspects 17-29.

Aspect 56: A non-transitory computer-readable medium storing code for wireless communication, the code comprising instructions executable by a processor to perform the method of one or more of Aspects 17-29.

Aspect 57: A non-transitory computer-readable medium storing a set of instructions for wireless communication, the set of instructions comprising one or more instructions that, when executed by one or more processors of a device, cause the device to perform the method of one or more of Aspects 17-29.

Aspect 58: An apparatus for wireless communication at a device, comprising a processor; memory coupled with the processor; and instructions stored in the memory and executable by the processor to cause the apparatus to perform the method of one or more of Aspects 30-42.

Aspect 59: A device for wireless communication, comprising a memory and one or more processors coupled to the memory, the one or more processors configured to perform the method of one or more of Aspects 30-42.

Aspect 60: An apparatus for wireless communication, comprising at least one means for performing the method of one or more of Aspects 30-42.

Aspect 61: A non-transitory computer-readable medium storing code for wireless communication, the code comprising instructions executable by a processor to perform the method of one or more of Aspects 30-42.

Aspect 62: A non-transitory computer-readable medium storing a set of instructions for wireless communication, the set of instructions comprising one or more instructions that, when executed by one or more processors of a device, cause the device to perform the method of one or more of Aspects 30-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE):

a memory; and one or more processors, coupled to the memory, configured to:

receive an event-based measurement report configuration that indicates a measurement threshold, a cell quantity threshold, and a beam quantity threshold;

determine that a first set of measurements of a first plurality of reference signals satisfy the measurement threshold, wherein each of the first plurality of reference signals is associated with a corresponding one of a first plurality of beams, and the first plurality of beams is associated with a first cell;

determine that one or more second sets of measurements, of one or more second pluralities of reference signals, satisfy the measurement threshold, wherein each of the one or more second pluralities of reference signals is associated with a corresponding one of one or more second pluralities of beams, and wherein each of the one or more second pluralities of beams is associated with a corresponding one of one or more second cells; and transmit a report when a quantity of cells, including the first cell and the one or more second cells, satisfies the cell quantity threshold, and when each of the one or more second pluralities of beams includes a quantity of beams that satisfies the beam quantity threshold.

2. The apparatus of claim 1, wherein the measurement threshold is a reference signal received power (RSRP) value.

3. The apparatus of claim 1, wherein the cell quantity threshold is two or more.

4. The apparatus of claim 1, wherein the beam quantity threshold is two.

5. An apparatus for wireless communication at a user equipment (UE), comprising:

a memory; and one or more processors, coupled to the memory, configured to:

receive an indication of a first set of reference signals and an indication of a first subset, of the first set of reference signals, that is associated with one or more uptilt antennas of a network, wherein the indication of the first set of reference signals includes a first plurality of bits, the indication of the first subset of the first set of reference signals includes a second plurality of bits, and the second plurality of bits includes a set of activated bits that is a subset of activated bits included in the first plurality of bits; and transmit a report based at least in part on the indication.

6. The apparatus of claim 5, wherein the one or more processors are further configured to:

receive an event-based measurement report configuration that indicates a measurement threshold and a beam quantity threshold; and determine that a first set of measurements of one or more of the first set of reference signals satisfy the measurement threshold, wherein the report is transmitted when a quantity of a first plurality of beams, that are associated with the one or more of the first set of reference signals, includes a quantity of beams that satisfies the beam quantity threshold.

7. The apparatus of claim 6, wherein the event-based measurement report configuration further indicates a cell quantity threshold.

8. The apparatus of claim 7, wherein the first plurality of beams is associated with one or more first cells, and the report is transmitted when a quantity of the one or more first cells satisfies the cell quantity threshold.

9. The apparatus of claim 5, wherein the indication of the first set of reference signals is associated with a serving cell.

10. The apparatus of claim 5, wherein the indication of the first set of reference signals is associated with a cell that neighbors a serving cell.

11. The apparatus of claim 5, wherein the one or more processors are further configured to:

determine that an altitude associated with the UE satisfies an altitude threshold, wherein the report is based at least in part on measurements of one or more of the first set of reference signals.

12. The apparatus of claim 5, wherein the one or more processors are further configured to:

receive, from the network, an indication of a first maximum associated with the first set of reference signals and an indication of a second maximum, different than the first maximum, associated with the first subset of the first set of reference signals, wherein the report is based at least in part on the first maximum or the second maximum.

13. The apparatus of claim 5, wherein the one or more processors are further configured to:

receive an indication of a set of cells that neighbor a serving cell including the network, and an indication of a subset, of the set of cells, that is associated with transmitting uptilt beams.

14. An apparatus for wireless communication at a network node, comprising:

a memory; and one or more processors, coupled to the memory, configured to:

transmit an indication of a first set of reference signals and an indication of a first subset, of the first set of reference signals, that is associated with one or more uptilt antennas of the network node, wherein the indication of the first set of reference signals includes a first plurality of bits, the indication of the first subset of the first set of reference signals includes a second plurality of bits, and the second plurality of bits includes a set of activated bits that is a subset of activated bits included in the first plurality of bits; and receive a report based at least in part on the indication.

15. The apparatus of claim 14, wherein the one or more processors are further configured to:

transmit an event-based measurement report configuration that indicates a measurement threshold and a beam quantity threshold, wherein the report is received when a first set of measurements of one or more of the first set of reference signals satisfy the measurement threshold and when a quantity of a first plurality of beams, that are associated with the one or more of the first set of reference signals, includes a quantity of beams that satisfies the beam quantity threshold.

16. The apparatus of claim 15, wherein the event-based measurement report configuration further indicates a cell quantity threshold.

17. The apparatus of claim 16, wherein the first plurality of beams is associated with one or more first cells, and the report is received when a quantity of the one or more first cells satisfies the cell quantity threshold.

18. The apparatus of claim 14, wherein the indication of the first set of reference signals is associated with a serving cell including the network node.

19. The apparatus of claim 14, wherein the indication of the first set of reference signals is associated with a cell that neighbors a serving cell including the network node.

20. The apparatus of claim 14, wherein the one or more processors are further configured to:

transmit an indication of an altitude threshold, wherein the report is based at least in part on measurements of one or more of the first set of reference signals.

* * * * *